United States Patent
Yambe et al.

(10) Patent No.: US 11,465,323 B2
(45) Date of Patent: Oct. 11, 2022

(54) METHOD FOR PRODUCING MULTILAYER FILM

(71) Applicant: RIKEN TECHNOS CORPORATION, Tokyo (JP)

(72) Inventors: Hideaki Yambe, Tokyo (JP); Kohei Nakashima, Tokyo (JP)

(73) Assignee: RIKEN TECHNOS CORPORATION

( * ) Notice: Subject to any disclaimer, the term of this patent is extended or adjusted under 35 U.S.C. 154(b) by 568 days.

(21) Appl. No.: 16/330,631

(22) PCT Filed: Jul. 25, 2017

(86) PCT No.: PCT/JP2017/026872
§ 371 (c)(1),
(2) Date: Mar. 5, 2019

(87) PCT Pub. No.: WO2018/042952
PCT Pub. Date: Mar. 8, 2018

(65) Prior Publication Data
US 2020/0223205 A1    Jul. 16, 2020

(30) Foreign Application Priority Data
Sep. 5, 2016    (JP) .............................. JP2016-172513

(51) Int. Cl.
*B29C 48/00*    (2019.01)
*B29C 48/21*    (2019.01)
(Continued)

(52) U.S. Cl.
CPC ........ *B29C 48/0011* (2019.02); *B29C 48/022* (2019.02); *B29C 48/21* (2019.02);
(Continued)

(58) Field of Classification Search
CPC ....... B29C 48/21; B29C 48/49; B29C 48/885; B29C 48/914; B29K 2033/04; B29K 2069/00
See application file for complete search history.

(56) References Cited

U.S. PATENT DOCUMENTS 5,055,531 A    10/1991    Fox et al.
10,112,369 B2    10/2018    Nakashima et al.
(Continued)

FOREIGN PATENT DOCUMENTS

JP    2009196153 A    9/2009
JP    2010125645 A    6/2010
(Continued)

OTHER PUBLICATIONS

English machine translation for JP2016-193600, Nov. 17, 2016 (Year: 2016).*

(Continued)

*Primary Examiner* — Galen H Hauth
(74) *Attorney, Agent, or Firm* — Bracewell LLP; Brad Y. Chin

(57) ABSTRACT

Embodiments provide a method for producing a multilayer film, the method including: (A) a step for continuously coextruding from a T die (3) a molten film (4) of a multilayer film in which a first acrylic resin layer ($\alpha 1$), an aromatic polycarbonate resin layer ($\beta$), and a second acrylic resin layer ($\alpha 2$) are directly laminated in the stated order using a coextrusion apparatus; (B) a step for feeding and pressing the molten film of the multilayer film between a first mirror surface body (5) that rotates or revolves and a second mirror surface body (6) that rotates or revolves so that the first acrylic resin layer ($\alpha 1$) is disposed on the first-mirror-surface-body side; and (C) a step for holding the pressed multilayer film against the first mirror surface body and sends the pressed multilayer film to the subsequent third (Continued)

mirror surface body (8) that rotates or revolves, where TR1 (surface temperature of first mirror surface body), TR2 (surface temperature of second mirror surface body), $T\alpha 1$ (glass transition temperature of first acrylic resin), $T\alpha 2$ (glass transition temperature of second acrylic resin), and $T\beta$ (glass transition temperature of aromatic polycarbonate resin) satisfy a prescribed relationship.

10 Claims, 7 Drawing Sheets

(51) Int. Cl.
| | |
|---|---|
| B32B 27/08 | (2006.01) |
| B32B 27/30 | (2006.01) |
| B32B 27/36 | (2006.01) |
| B32B 37/15 | (2006.01) |
| B29C 48/885 | (2019.01) |
| B29C 48/49 | (2019.01) |
| B29C 48/88 | (2019.01) |
| B29C 48/92 | (2019.01) |
| B29K 33/04 | (2006.01) |
| B29K 69/00 | (2006.01) |
| B29L 7/00 | (2006.01) |

(52) U.S. Cl.
CPC ............ B29C 48/49 (2019.02); B29C 48/885 (2019.02); B29C 48/914 (2019.02); B29C 48/92 (2019.02); B32B 27/08 (2013.01); B32B 27/308 (2013.01); B32B 27/365 (2013.01); B32B 37/153 (2013.01); B29K 2033/04 (2013.01); B29K 2069/00 (2013.01); B29L 2007/008 (2013.01); B32B 2255/10 (2013.01); B32B 2307/412 (2013.01); B32B 2457/208 (2013.01)

(56) References Cited

U.S. PATENT DOCUMENTS

| | | | | |
|---|---|---|---|---|
| 10,118,988 | B2* | 11/2018 | Nakayasu | C08G 64/081 |
| 2008/0213607 | A1* | 9/2008 | Morita | B29C 48/307 |
| | | | | 428/515 |
| 2015/0224748 | A1 | 8/2015 | Onishi et al. | |
| 2016/0229159 | A1 | 8/2016 | Nakashima et al. | |

FOREIGN PATENT DOCUMENTS

| | | |
|---|---|---|
| JP | 2011161871 A | 8/2011 |
| JP | WO2010024217 A | 1/2012 |
| JP | 2012096357 A | 5/2012 |
| JP | 2012121271 A | 6/2012 |
| JP | 2013022822 A | 2/2013 |
| JP | 2013193241 A | 9/2013 |
| JP | 2014121849 A | 7/2014 |
| JP | 2015-083370 A | 4/2015 |
| JP | 2015066812 A | 4/2015 |
| JP | 2015083370 A | 4/2015 |
| JP | 2015128899 A | 7/2015 |
| JP | 2016020052 A | 2/2016 |
| JP | 2016193600 A | 11/2016 |
| JP | 2017164969 A | 9/2017 |
| JP | 2020152792 A | 9/2020 |
| KR | 20160060044 A | 5/2016 |
| TW | 201429715 A | 8/2014 |
| TW | 201634281 A | 10/2016 |
| WO | 2006132208 A1 | 12/2006 |
| WO | 2016052989 A1 | 4/2016 |
| WO | 2016060100 A1 | 4/2016 |
| WO | 2016147739 A1 | 9/2016 |
| WO | 2017030147 A1 | 2/2017 |

OTHER PUBLICATIONS

CN201880038884.6 First Office Action dated Jul. 26, 2021, 14 pgs.
KR10-2019-7009384 First Office Action dated May 20, 2021, 9 pgs.
CN201780054002.0 1st Office Action dated Sep. 21, 2020, 27 pgs.
PCT/JP2018/019344 International Preliminary Report on Patentability dated Dec. 26, 2019; 19 pgs.
EP17845961.6 Supplementary European Search Report dated Mar. 27, 2020, 10 pgs.
PCT/JP2018/019344 International Search Report dated Jul. 3, 2018; 2 pgs.
PCT/JP2017/026872 International Search Report dated Sep. 5, 2017; 2 pgs.
EP18817498.1 Extended European Search Report dated Feb. 1, 2021, 7 pgs.
JP2017-151196 First Office Action dated Dec. 22, 2020, 7 pgs.
JP2017-151196 Third party Observations dated Sep. 15, 2020, 11 pgs.
TW107117990 First Office Action dated Dec. 2, 2021, 15 pgs.
Osamu, et al., Effects of Injection Molding Conditions on Replication, Birefringence and Optical Property of Microscopic V-grove Structures for Polycarbonate, Seikei-Kakou vol. 20 No 10 2008, pp. 762-768.
JP2018-107334 Office Action dated Feb. 21, 2022, 11 pgs.

* cited by examiner

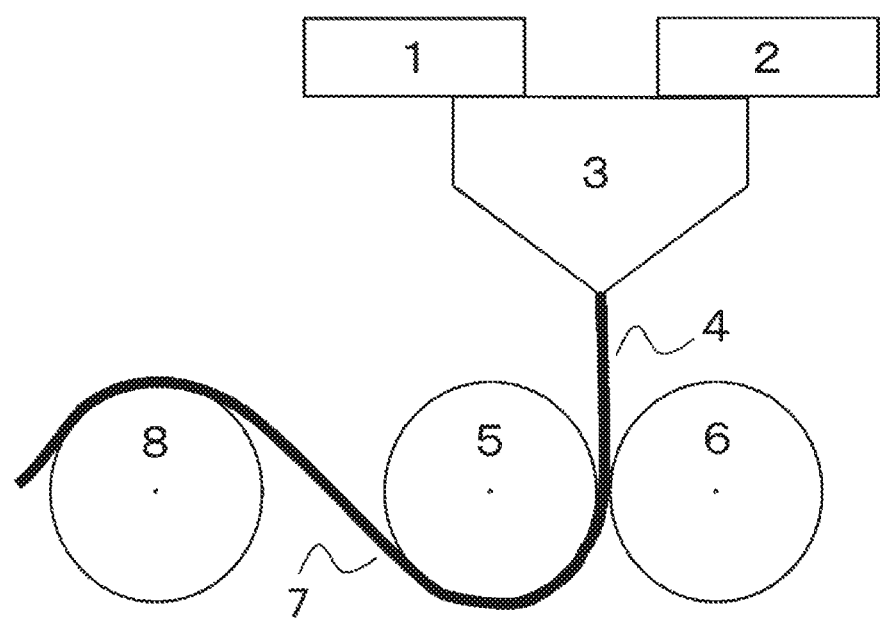

Current Data Parameters
NAME          NH15090098
EXPNO                  6
PROCNO                 1

F2 - Acquisition Parameters
Date_           20151021
Time                14.23
INSTRUM             spect
PROBHD   5 mm CPDCH 13C
PULPROG             zg4S
TD                  65536
SOLVENT            CDC13
NS                     16
DS                      1
SWH          10000.000 Hz
FIDRES         0.152588 Hz
AQ            3.2767999 sec
RG                  11.36
DW              50.000 usec
DE              10.00 usec
TE                298.1 K
D1           6.72319984 sec
TDO                     1

********** CHANNEL f1 **********
SFO1         500.1325007 MHz
NUC1                   1H
P1             10.00 usec
PLW1        14.50000000 W F2 - Processing parameters
SI                  32768
SF          500.1300000 MHz
WDW                    EM
SSB                     0
LB                0.16 Hz
GB                      0
PC               1.00 sec

METHOD FOR PRODUCING MULTILAYER FILM

CROSS REFERENCE TO RELATED APPLICATIONS

This application claims the benefit of and priority to PCT/JP2017/026872, filed on Jul. 25, 2017, entitled (translation), "METHOD FOR PRODUCING MULTILAYER FILM," which claims the benefit of and priority to Japanese Patent Application No. 2016-172513, filed on Sep. 5, 2016, which are hereby incorporated by reference in their entirety into this application.

BACKGROUND

Embodiments relate to a method for producing a multilayer film. More specifically, embodiments relate to a method for producing a multilayer film with suppressed warpage deformation.

DESCRIPTION OF THE RELATED ART

In recent years, touch panels that are installed on image display devices such as liquid crystal displays, plasma displays, and electroluminescence displays and can perform input by touching with fingers, pens, or the like while viewing the display have become widespread.

Conventionally, glass-based members have been used in a display surface plate or a transparent conductive substrate of a touch panel since the glass-based members meet the required properties such as heat resistance, dimensional stability, high transparency, high surface hardness, high rigidity, and the like. Meanwhile, glass has disadvantages such as low impact resistance, low breakability, low processability, difficult handling, high specific gravity, and difficulty in meeting the demand for curved display or flexible display.

Therefore, hard coat laminated films are extensively studied as a substitute for glass. As the film base material of the hard coat laminated film, from a viewpoint of high surface hardness, abrasion resistance, and cutting processability, a multilayer film in which a first acrylic resin layer, an aromatic polycarbonate resin layer, and a second acrylic resin layer are directly laminated in the stated order is frequently proposed. However, there is a disadvantage that it is difficult for the multilayer film to suppress warpage deformation, particularly warpage deformation after moisture and heat treatment. As a technique for suppressing warpage deformation, methods for controlling a peripheral speed of a cooling roll (see, for example, JP-A-2012-096357 and JP-A-2013-193241) and a method for heating a film with a heater after passing through a cooling roll (see, for example, JP-A-2012-121271) have been proposed. However, these techniques are not fully satisfactory.

SUMMARY

An object of the various embodiments is to provide a novel method for obtaining a multilayer film in which warpage deformation, particularly warpage deformation after moisture and heat treatment, is suppressed. It is desirable that the multilayer film is excellent in transparency, color tone, and appearance, and is small in retardation.

Another object of the various embodiments is to provide a novel multilayer film in which warpage deformation, particularly warpage deformation after moisture and heat treatment, is suppressed.

According to various embodiments, the above objects can be achieved by making a glass transition temperature of a source material resin and molding conditions satisfy specific relational expressions.

According to at least one embodiment, there is provided a method for producing a multilayer film, including: (A) a step for continuously coextruding, from a T die, a molten film of a multilayer film in which a first acrylic resin layer ($\alpha 1$), an aromatic polycarbonate resin layer ($\beta$), and a second acrylic resin layer ($\alpha 2$) are directly laminated in the stated order by using a coextrusion apparatus provided with an extruder and the T die; (B) a step for feeding and pressing the molten film of the multilayer film between a first mirror-finished body that rotates or circulates and a second mirror-finished body that rotates or circulates so that the first acrylic resin layer ($\alpha 1$) is disposed on the first-mirror-finished-body side; and (C) a step for holding the multilayer film pressed in the step (B) against the first mirror-finished body and sending the pressed multilayer film to a subsequent third mirror-finished body that rotates or circulates, where the following formulae (1) to (3) are satisfied:

$$(T\alpha_1 - 15) \leq TR_1 \leq (T\alpha_1 + 10) \quad (1)$$

$$(T\alpha_2 - 25) \leq TR_2 < (T\alpha_2 + 5) \quad (2)$$

$$(T\beta - 20) \leq TR_1 \quad (3)$$

where $TR_1$ is a surface temperature of the first mirror-finished body, $TR_2$ is a surface temperature of the second mirror-finished body, $T\alpha_1$ is a glass transition temperature of an acrylic resin constituting the first acrylic resin layer ($\alpha 1$), $T\alpha_2$ is a glass transition temperature of an acrylic resin constituting the second acrylic resin layer ($\alpha 2$), $T\beta$ is a glass transition temperature of an aromatic polycarbonate resin constituting the aromatic polycarbonate resin layer ($\beta$), and all temperature units are ° C.

According to at least one embodiment, the following formulae (4-1) and (4-2) are satisfied:

$$(T\beta - T\alpha_1) \leq 30 \quad (4\text{-}1)$$

$$(T\beta - T\alpha_2) \leq 30 \quad (4\text{-}2)$$

where $T\alpha_1$, $T\alpha_2$, and $T\beta$ are as defined above.

According to at least one embodiment, the glass transition temperature of the aromatic polycarbonate resin constituting the aromatic polycarbonate resin layer ($\beta$) is 100-140° C.

According to at least one embodiment, the aromatic polycarbonate resin constituting the aromatic polycarbonate resin layer ($\beta$) contains a structural unit derived from an aromatic dihydroxy compound in an amount of 99-80 mol % and a structural unit derived from an aliphatic dicarboxylic acid in an amount of 1-20 mol %, based on 100 mol % of the sum of the structural unit derived from the aromatic dihydroxy compound and the structural unit derived from the aliphatic dicarboxylic acid.

According to at least one embodiment, the acrylic resin constituting the first acrylic resin layer ($\alpha 1$) and the acrylic resin constituting the second acrylic resin layer ($\alpha 2$) are the same acrylic resin and contain a structural unit derived from methyl(meth)acrylate in an amount of 50-95 mol % and a structural unit derived from vinylcyclohexane in an amount of 50-5 mol %, based on 100 mol % of the sum of structural units derived from a polymerizable monomers.

According to at least one embodiment, there is provided a method for producing a hard coat laminated film, including: a step for producing a multilayer film by the method according to the various embodiments described herein; and a step for forming a hard coat on at least one side of the multilayer film obtained in the above step.

According to at least one embodiment, there is provided a method for producing an article, including: a step for producing a film by the various embodiments described herein; and a step for forming an article including the film obtained in the above step.

According to at least one embodiment, there is provided a multilayer film, where a first acrylic resin layer (α1), an aromatic polycarbonate resin layer (β), and a second acrylic resin layer (α2) are directly laminated in the stated order, a glass transition temperature of an aromatic polycarbonate resin constituting the aromatic polycarbonate resin layer (β) is 100-140° C., and the following formulae (4-1) and (4-2) are satisfied;

$$(T\beta - T\alpha_1) \leq 30 \quad (4-1)$$

$$(T\beta - T\alpha_2) \leq 30 \quad (4-2)$$

where $T\alpha_1$ is a glass transition temperature of an acrylic resin constituting the first acrylic resin layer (α1), $T\alpha_2$ is a glass transition temperature of an acrylic resin constituting the second acrylic resin layer (α2), and $T\beta$ is a glass transition temperature of an aromatic polycarbonate resin constituting the aromatic polycarbonate resin layer (β).

According to at least one embodiment, the aromatic polycarbonate resin constituting the aromatic polycarbonate resin layer (β) contains a structural unit derived from an aromatic dihydroxy compound in an amount of 99-80 mol % and a structural unit derived from an aliphatic dicarboxylic acid in an amount of 1-20 mol %, based on 100 mol % of the sum of the structural unit derived from the aromatic dihydroxy compound and the structural unit derived from the aliphatic dicarboxylic acid.

According to at least one embodiment, the acrylic resin constituting the first acrylic resin layer (α1) and the acrylic resin constituting the second acrylic resin layer (α2) are the same acrylic resin and contain a structural unit derived from methyl (meth)acrylate in an amount of 50-95 mol % and a structural unit derived from vinylcyclohexane in an amount of 50-5 mol %, based on 100 mol % of the sum of structural units derived from polymerizable monomers.

According to at least one embodiment, the following properties (i) and (ii) are satisfied:

(i) a total light transmittance is 85% or more; and (ii) a retardation is 75 nm or less.

According to at least one embodiment, the following property (iii) is further satisfied:

(iii) water absorption measured under the condition of immersion time of 24 hours according to an A method of JIS K7209:2009 is 1 mass % or less.

According to at least one embodiment, there is provided a hard coat laminated film having a hard coat on at least one side of the multilayer film according to the various embodiments described herein.

According to at least one embodiment, there is provided an article including the film according to the various embodiments described herein.

BRIEF DESCRIPTION OF DRAWINGS

FIG. 1 is a conceptual diagram illustrating an example of an apparatus used in a production method of an embodiment.

FIGS. 2A and 2B are a $^1$H-NMR spectrum of an acrylic resin (α-1) used in Examples.

FIGS. 3A and 3B are a $^{13}$C-NMR spectrum of an acrylic resin (α-1) used in Examples.

DETAILED DESCRIPTION

Figure 2A:
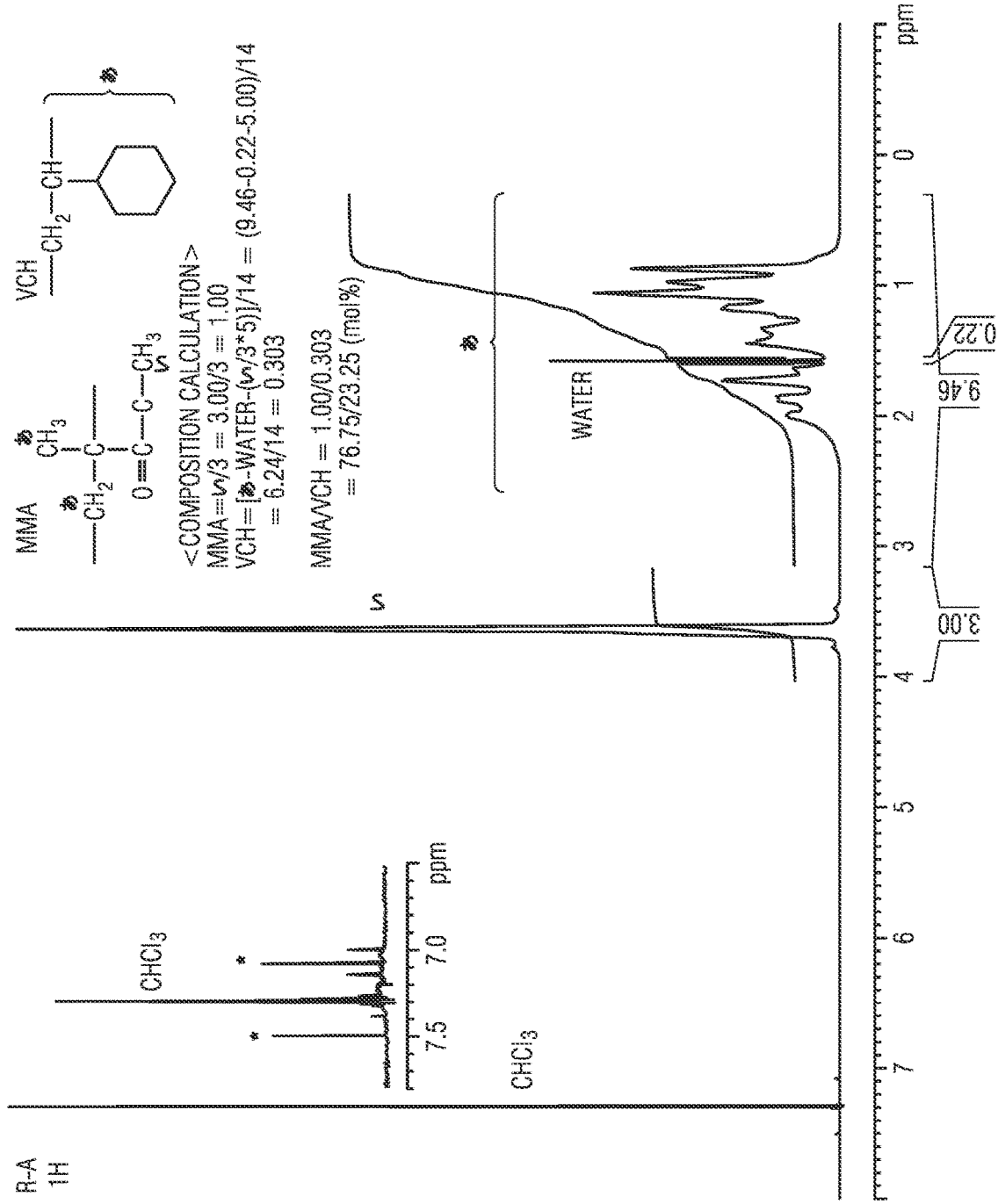

In the present specification, the term "film" is used as a term including a sheet. The term "resin" is used as a term including a resin mixture including two or more resins and a resin composition including components other than the resin. In addition, in the present specification, sequentially laminating one layer and another layer means both directly laminating the layers and laminating the layers by interposing one or more layers, such as an anchor coat, between the layers. The term "or more" for a numerical range is used to mean a certain numerical value or a numerical value exceeding the certain numerical value. For example, 20% or more means 20% or a value exceeding 20%. The term "or less" for a numerical range is used to mean a certain numerical value or a numerical value less than the certain numerical value. For example, 20% or less means 20% or a value less than 20%. Further, the symbol "-" for a numerical range is used to mean a certain numerical value, a numerical value greater than the certain numerical value and less than another numerical value, or the other numerical value. Here, the other numerical value is a numerical value greater than the certain numerical value. For example, 10-90% means 10%, greater than 10% and less than 90%, or 90%.

Except for Examples or unless otherwise specified, all numerical values used in the present specification and claims should be understood as being modified by the term "about". Without intending to limit the application of the doctrine of equivalents to the scope of the claims, each numerical value should be interpreted in light of significant figures and by applying ordinary rounding techniques.

1. Method for Producing Multilayer Film

A method for producing a multilayer film according to at least one embodiment includes: (A) a step for continuously coextruding, from a T die, a molten film of a multilayer film in which a first acrylic resin layer (α1), an aromatic polycarbonate resin layer (β), and a second acrylic resin layer (α2) are directly laminated in the stated order by using a coextrusion apparatus provided with an extruder and the T die; (B) a step for feeding and pressing the molten film of the multilayer film between a first mirror-finished body that rotates or circulates and a second mirror-finished body that rotates or circulates so that the first acrylic resin layer (α1) is disposed on the first-mirror-finished-body side; and (C) a step for holding the multilayer film pressed in the step (B) against the first mirror-finished body and sending the pressed multilayer film to a subsequent third mirror-finished body that rotates or circulates.

According to at least one embodiment, the coextrusion apparatus used in the step (A) is not particularly limited, and any coextrusion apparatuses can be used. Examples of the coextrusion apparatus include a coextrusion apparatus such as a feed block system, a multi-manifold system, and a stack plate system.

According to at least one embodiment, the T die used in the step (A) is not particularly limited, and any T dies can be used. Examples of the T die include a manifold die, a fish tail die, and a coat hanger die.

From a viewpoint of stably performing the process of continuously coextruding the molten film of the multilayer film, the set temperature of the T die may be usually 240° C. or more, and preferably 250° C. or more. On the other hand, from a viewpoint of suppressing deterioration of the resin, the set temperature of the T die may be usually 320° C. or less, and preferably 300° C. or less. The set temperature of the T die is usually 240° C. or more and 320° C. or less, and preferably 240° C. or more and 300° C. or less, 250° C. or more and 320° C. or less, or 250° C. or more and 300° C. or less.

According to at least one embodiment, the extruder used in the step (A) is not particularly limited, and any extruders can be used. Examples of the extruder include a single screw extruder, a co-rotating twin-screw extruder, and a counter-rotating twin screw extruder.

In order to suppress deterioration of an acrylic resin constituting the first acrylic resin layer ($\alpha$1), an aromatic polycarbonate resin constituting the aromatic polycarbonate resin layer ($\beta$), and an acrylic resin constituting the second acrylic resin layer ($\alpha$2), it is preferable to purge the inside of the extruder with nitrogen.

In the following, for the sake of simplicity, the acrylic resin constituting the first acrylic resin layer ($\alpha$1) may be simply referred to as a "first acrylic resin", the aromatic polycarbonate resin constituting the aromatic polycarbonate resin layer ($\beta$) may be simply referred to as an "aromatic polycarbonate resin", and the acrylic resin constituting the second acrylic resin layer ($\alpha$2) may be simply referred to as a "second acrylic resin". In addition, the "first acrylic resin" and the "second acrylic resin" may be identical to or different from each other, but these may be collectively referred to as an "acrylic resin".

According to at least one embodiment, it is preferable to dry the first acrylic resin, the aromatic polycarbonate resin, and the second acrylic resin before being subjected to film formation. It is also preferable that these resins dried by a dryer are directly transported and introduced from the dryer to the extruder. The set temperature of the dryer may be appropriately determined in consideration of the glass transition temperature of the resin to be dried. When the glass transition temperature is Tg(° C.), the set temperature of the dryer may be usually (Tg-70)-(Tg-10)° C., preferably (Tg-60)-(Tg-10)° C., more preferably (Tg-50)-(Tg-10)° C., and further preferably (Tg-40)-(Tg-10)° C. It is also preferable to provide a vacuum vent in the extruder usually at a position corresponding to a metering zone at the tip of a screw.

According to at least one embodiment, the term "glass transition temperature" as used herein is a midpoint glass transition temperature calculated from a curve of a last temperature increase process measured by a program that uses a Diamond DSC type differential scanning calorimeter commercially available from Perkin Elmer Japan Co., Ltd., according to JIS K7121-1987, to be kept at 250° C. for 3 minutes, cooled to 20° C. at 10° C./min, kept at 20° C. for 3 minutes, and increases the temperature to 250° C. at 10° C./min.

In the multilayer film produced by the method of at least one embodiment, the first acrylic resin layer ($\alpha$1), the aromatic polycarbonate resin layer ($\beta$), and the second acrylic resin layer ($\alpha$2) are directly laminated in the stated order.

According to at least one embodiment, the acrylic resin is excellent in surface hardness, but tends to be insufficient in cutting processability. The aromatic polycarbonate resin is excellent in cutting processability, but tends to be insufficient in surface hardness. Therefore, due to the above-described layer structure, it is possible to easily obtain the multilayer film that is excellent in both surface hardness and cutting processability by supplementing the weak points of either of the two resins.

According to at least one embodiment, the layer thickness of the ($\alpha$1) layer in the multilayer film produced by the method of various embodiments is not particularly limited, but from a viewpoint of the surface hardness, may be usually 10 μm or more, preferably 20 μm or more, more preferably 40 μm or more, further preferably 60 μm or more, and most preferably 80 μm or more.

According to at least one embodiment, the layer thickness of the ($\alpha$2) layer in the multilayer film produced by the method of various embodiments is not particularly limited, but from a viewpoint of suppressing the warpage deformation, it is preferable that the layer thickness is the same as that of the ($\alpha$1) layer.

Here, "the same layer thickness" should not be interpreted as the same layer thickness in a physicochemically strict sense. It should be interpreted as the same layer thickness within the range of the deflection width of the process/quality control which is commonly performed industrially. If the two layers have the same layer thickness within the range of the deflection width of the process/quality control which is commonly performed industrially, the warpage deformation of the multilayer film can be sufficiently suppressed. In the case of an unstretched multilayer film by a T die coextrusion method, for example, when the set layer thickness is 70 μm, since the process and quality control is commonly performed with a width of about −5 to +5 μm, the layer thickness of 65 μm and the thickness of 75 μm should be interpreted as the same. Here, the "same layer thickness" can also be said as "substantially the same layer thickness".

According to at least one embodiment, the layer thickness of the ($\beta$) layer in the multilayer film produced by the method of various embodiments is not particularly limited, but from a viewpoint of the cutting processability, may be usually 20 μm or more, and preferably 80 μm or more.

In addition, the upper limit of the layer thickness of the ($\alpha$1) layer itself, the ($\alpha$2) layer itself, or the ($\beta$) layer itself is not particularly limited, but may be limited by the preferable range of the thickness of the entire multilayer film as described later.

According to at least one embodiment, the total thickness of the multilayer film is not particularly limited and can be set to any thickness as desired. From a viewpoint of handling of the multilayer film, the total thickness of the multilayer film is usually 20 μm or more, and preferably 50 μm or more. In the case in which the above multilayer film is used for applications not requiring high rigidity, the total thickness of the multilayer film is usually 250 μm or less, and preferably 150 μm or less from a viewpoint of cost reduction. In the case in which the multilayer film is used as a display faceplate, the total thickness of the multilayer film is usually 300 μm or more, preferably 500 μm or more, and more preferably 600 μm or more from a viewpoint of maintaining the rigidity. In addition, from a viewpoint of meeting the demand for reducing the thickness of the device, the total thickness of the multilayer film is usually 1,500 μm or less, preferably 1,200 μm or less, and more preferably 1,000 μm or less.

According to at least one embodiment, the acrylic resins constituting the ($\alpha$1) layer and the ($\alpha$2) layer are not particularly limited, but examples thereof include a (meth) acrylic acid ester (co)polymer, a copolymer mainly including a structural unit derived from a (meth)acrylic acid ester (usually 50 mol % or more, preferably 65 mol % or more, and more preferably 70 mol % or more), and modified products thereof. The term "(meth)acrylic" means acrylic or methacrylic. The (co)polymer means a polymer (homopolymer) or a copolymer.

Examples of the (meth)acrylic acid ester (co)polymer can include poly(methyl (meth)acrylate), poly(ethyl (meth)acrylate), poly(propyl (meth)acrylate), poly(butyl (meth)acrylate), a methyl (meth)acrylate-butyl (meth)acrylate copolymer, and an ethyl (meth)acrylate-butyl (meth)acrylate copolymer.

Examples of the copolymer mainly including the structural unit derived from (meth)acrylic acid ester can include an ethylene-methyl (meth)acrylate copolymer, a styrene-methyl (meth)acrylate copolymer, a vinyl cyclohexane-methyl (meth)acrylate copolymer, a maleic anhydride-methyl (meth)acrylate copolymer, and an N-substituted maleimide-mathyl (meth)acrylate copolymer.

Examples of the modified product can include a polymer into which a lactone ring structure is introduced by an intramolecular cyclization reaction; a polymer into which glutaric anhydride is introduced by an intramolecular cyclization reaction, and a polymer into which an imide structure is introduced by reacting with an imidizing agent (for example, methylamine, cyclohexylamine, ammonia, or the like), which is hereinafter sometimes referred to as a poly (meth)acrylimide resin.

According to at least one embodiment, the acrylic resin is preferably a vinyl cyclohexane/methyl (meth)acrylate copolymer. It is possible to obtain a multilayer film which is excellent in transparency, color tone, appearance, and moisture resistance, and is small in retardation.

According to at least one embodiment, the acrylic resin is more preferably a vinyl cyclohexane/methyl (meth)acrylate copolymer including 50-95 mol %, preferably 65-90 mol %, and more preferably 70-85 mol % of a structural unit derived from methyl (meth)acrylate (hereinafter, sometimes abbreviated as MA/MMA), and 50 to 5 mol %, preferably 35-10 mol %, and more preferably 30-15 mol % of a structural unit derived from vinylcyclohexane (hereinafter, sometimes abbreviated as VCH) based on 100 mol % of the total sum of structural units derived from polymerizable monomers. Here, the sum of the MA/MMA content and the VCH content is usually 80 mol % or more, preferably 90 mol % or more, more preferably 95 mol % or more, and further preferably 99 mol % or more and 100 mol % or less. Here, the term "polymerizable monomers" means methyl (meth)acrylate, vinylcyclohexane, and monomers copolymerizable therewith. The copolymerizable monomer is usually a compound having a carbon-carbon double bond, and is typically a compound having an ethylenic double bond.

According to at least one embodiment, the acrylic resin is more preferably a vinyl cyclohexane/methyl methacrylate copolymer including 50-95 mol %, preferably 65-90 mol %, and more preferably 70-85 mol % of a structural unit derived from methyl methacrylate (hereinafter, sometimes abbreviated as MMA), and 50 to 5 mol %, preferably 35-10 mol %, and more preferably 30-15 mol % of a structural unit derived from vinylcyclohexane (hereinafter, sometimes abbreviated as VCH) based on 100 mol % of the total sum of structural units derived from polymerizable monomers. Here, the sum of the MMA content and the VCH content is usually 80 mol % or more, preferably 90 mol % or more, more preferably 95 mol % or more, and further preferably 99 mol % or more and 100 mol % or less. Here, the term "polymerizable monomers" means methyl methacrylate, vinylcyclohexane, and monomers copolymerizable therewith. The copolymerizable monomer is usually a compound having a carbon-carbon double bond, and is typically a compound having an ethylenic double bond.

According to at least one embodiment, the content of each structural unit such as MA/MMA content or MMA content and VCH content in the vinyl cyclohexane/methyl (meth)acrylate methyl copolymer can be obtained by $^1$H-NMR and $^{13}$C-NMR.

The $^1$H-NMR spectrum can be measured, for example, by dissolving 15 mg of a sample in 0.6 mL of chloroform-$d_1$ solvent and using a 500 MHz nuclear magnetic resonance apparatus under the following conditions. FIGS. 2A and 2B illustrate an example of measurement of the $^1$H-NMR spectrum of the acrylic resin (α-1) used in Examples described later.

Chemical shift criteria: automatic setting by apparatus
Measurement mode: single pulse
Pulse width: 45° (5.0 μs)
Number of points: 32K
Measurement range: 15 ppm (−2.5 to 12.5 ppm)
Repeat time: 10.0 seconds
Number of integrations: 16 times
Measurement temperature: 25° C.
Window function: exponential (BF: 0.16 Hz)

Figure 3A:
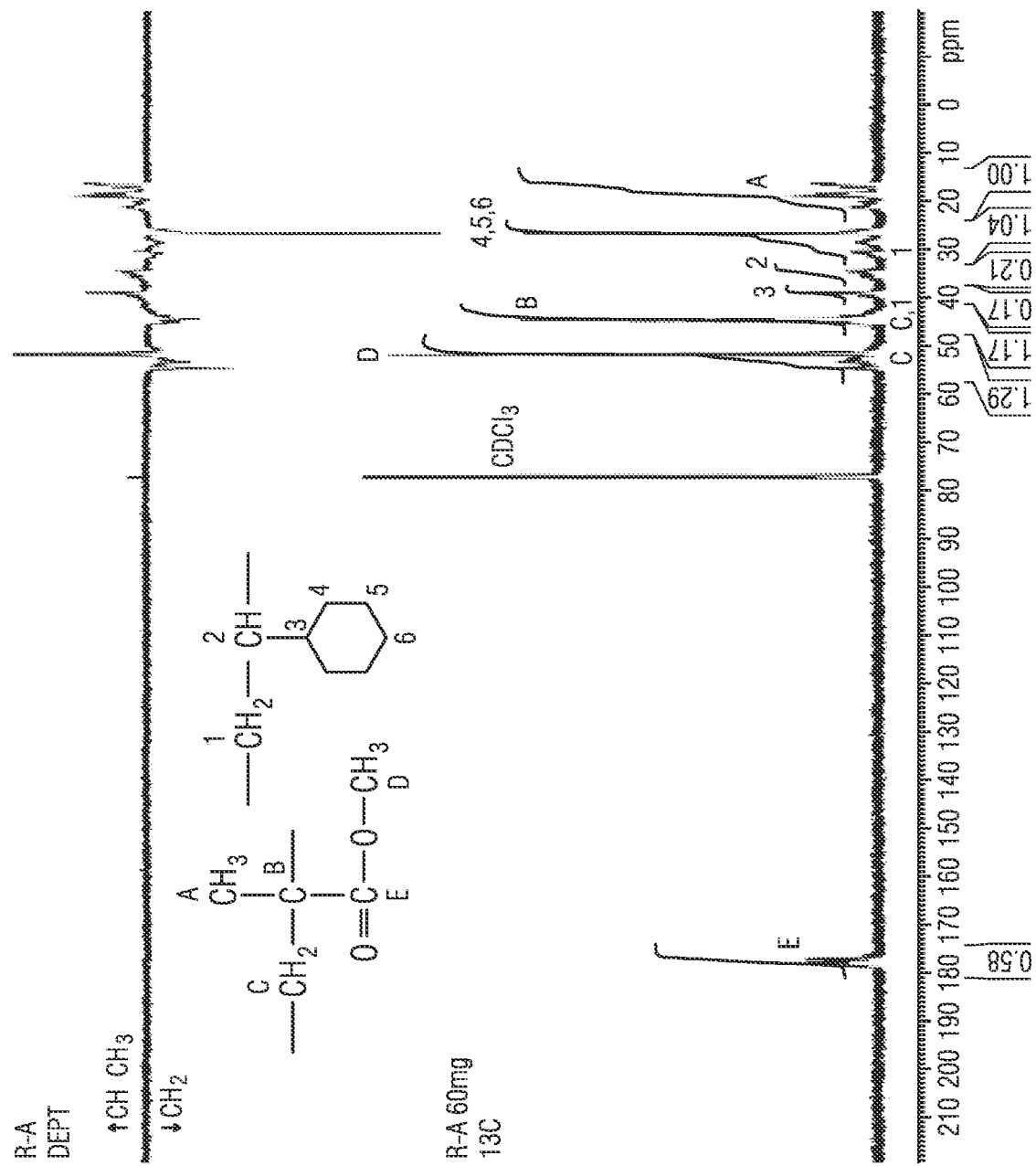
Figure 3B:
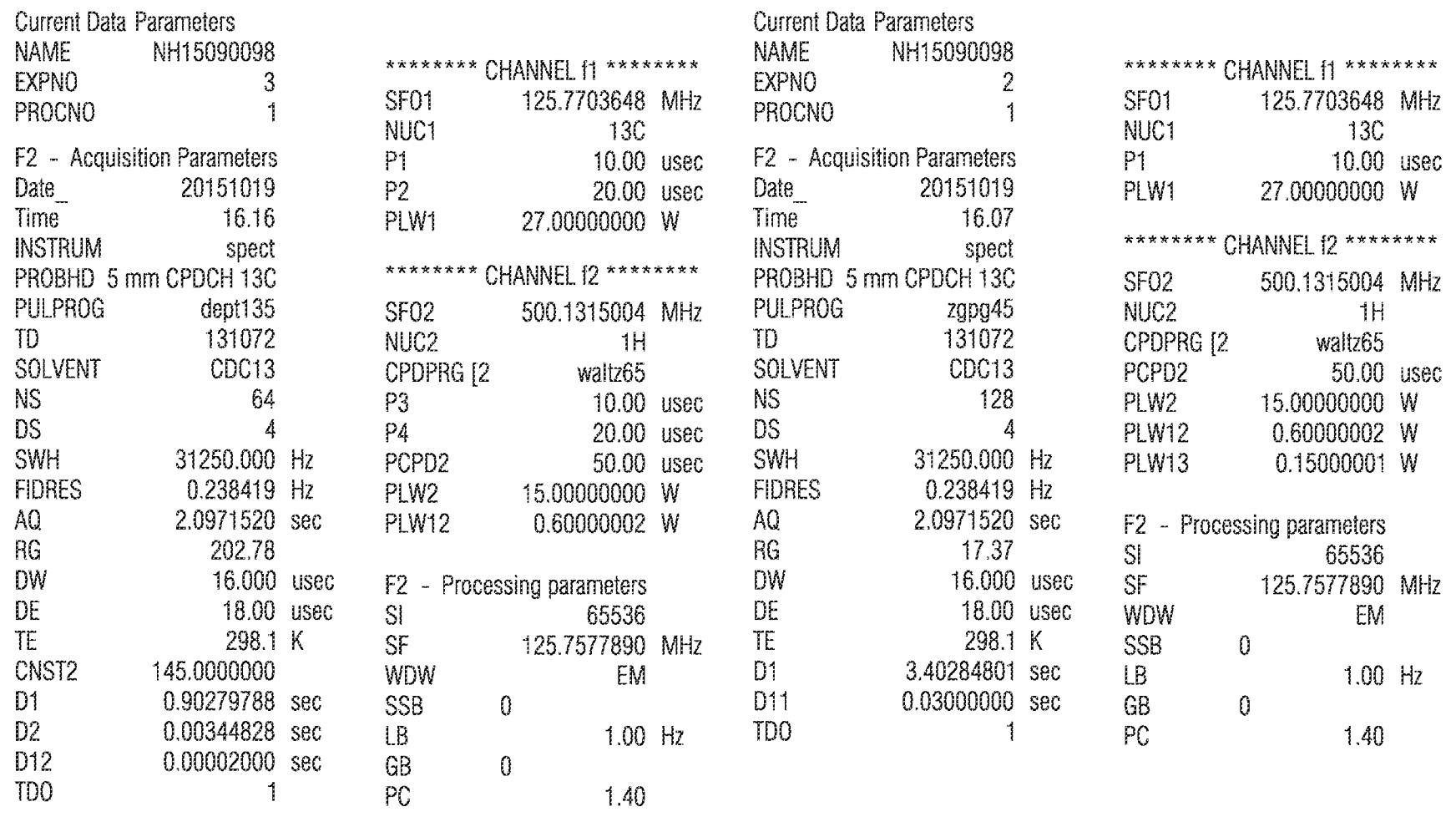

The $^{13}$C-NMR spectrum can be measured, for example, by dissolving 60 mg of a sample in 0.6 mL of chloroform-$d_1$ solvent and using a 125 MHz nuclear magnetic resonance apparatus under the following conditions. FIGS. 3A and 3B illustrate an example of measurement of the $^{13}$C-NMR spectrum of the acrylic resin (α-1) used in Examples described later.

Chemical shift criteria: automatic setting by apparatus
Measurement mode: single pulse proton broadband decoupling
Pulse width: 45° (5.0 μs)
Number of points: 64K
Measurement range: 250 ppm (−25 to 225 ppm)
Repeat time: 5.5 seconds
Number of integrations: 128 times
Measurement temperature: 25° C.
Window function: exponential (BF: 1.00 Hz)

Peak attribution can be performed with reference to "Polymer Analysis Handbook (First edition, vol. 1, Sep. 20, 2008, Edited by the Polymer Analytical Council of Japan Analytical Chemistry, Asakura Shoten Co., Ltd.)" or "NMR database of Materials Information Station (National Institute for Materials Science and Technology, http://polymer.nims go.jp/NMR/)", and the ratio of each structural unit in the acrylic resin constituting the (α1) layer and the (α2) layer can be calculated from the peak area ratio. The measurements of $^1$H-NMR and $^{13}$C-NMR can also be performed at an analytical institution such as Mitsui Chemical Analysis Center, Inc.

The method for producing the vinyl cyclohexane/methyl (meth)acrylate copolymer is not particularly limited, and a known method can be used.

According to at least one embodiment, the vinyl cyclohexane/methyl (meth)acrylate copolymer may be a resin mixture containing two or more kinds. In the case of the resin mixture, the sum of the contents of the structural unit derived from methyl(meth)acrylate as the mixture and the sum of the contents of the structural unit derived from vinylcyclohexane may be controlled to fall within the above-described range.

As the acrylic resin, a mixture of one type or two or more types of these resins can be used.

If desired, the acrylic resin may contain a core-shell rubber as long as it does not contradict the purpose of the various embodiments. When the core-shell rubber is used in an amount of usually 0 to 50 parts by mass, and preferably 3 to 30 parts by mass, based on 100 parts by mass of the acrylic resin, the cutting processability and impact resistance can be enhanced.

Examples of the core/shell rubber include a methacrylic acid ester/styrene/butadiene rubber graft copolymer, an acrylonitrile styrene/butadiene rubber graft copolymer, an acrylonitrile styrene/ethylene propylene rubber graft copolymer, an acrylonitrile styrene/acrylic acid ester graft copolymer, a methacrylic acid ester/acrylic acid ester rubber graft copolymer, and a methacrylic acid ester/acrylonitrile/acrylic acid ester rubber graft copolymer. As the core-shell rubber, a mixture of one type or two or more types of these resins can be used.

If desired, as long as it does not contradict the purpose of the various embodiments, the acrylic resin can further contain: a thermoplastic resin other than the acrylic resin or the core-shell rubber; a pigment, an inorganic filler, an organic filler, or a resin filler; and an additive such as a lubricant, an antioxidant, a weather resistance stabilizer, a heat stabilizer, a release agent, an antistatic agent, and a surfactant. Generally, the blending amount of the optional component(s) is usually about 0.01 to 10 parts by mass based on 100 parts by mass of the acrylic resin.

Preferable examples of the above optional components include a release agent. The release agent can be used usually in an amount of 0.01 to 1 part by mass, and preferably 0.02 to 0.1 part by mass, based on 100 parts by mass of the acrylic resin. By using the release agent in an amount within such a range, troubles such as adhesion of the molten film to the first mirror-finished body can be suppressed.

According to at least one embodiment, the first acrylic resin used for the ($\alpha$1) layer and the second acrylic resin used for the ($\alpha$2) layer may be different acrylic resins, for example, acrylic resins that are different in kind, composition, melt mass flow rate, glass transition temperature, and the like. From a viewpoint of suppressing warpage deformation, it is preferable to use the same acrylic resin. For example, the use of the same lot of the same grade is one of preferred embodiments.

According to at least one embodiment, the aromatic polycarbonate resin constituting the ($\beta$) layer is a polymer mainly containing a polycondensed structural unit of an aromatic dihydroxy compound and a carbonic acid (in an amount of usually 80 mol % or more, preferably 84 mol % or more, more preferably 86 mol % or more, and further preferably 88 mol % or more, based on 100 mol % of the total sum of all structural units). Such an aromatic polycarbonate resin can be obtained, for example, by an interfacial polymerization method of an aromatic dihydroxy compound and phosgene or an ester exchange reaction of an aromatic dihydroxy compound and a carbonic acid diester such as diphenyl carbonate.

Examples of the aromatic dihydroxy compound can include bisphenol A (2,2-bis(4-hydroxyphenyl)propane), 2,2-bis(4-hydroxy-3-methylphenyl)propane, 2,2-bis(4-hydroxy-3,5-dimethylphenyl)propane, 2,2-bis(4-hydroxy-3,5-diethylphenyl)propane, 2,2-bis(4-hydroxyphenyl)pentane, 3,3-bis(4-hydroxyphenyl)pentane, 1,1-bis(4-hydroxyphenyl)cyclohexane, 1,1-bis(4-hydroxyphenyl)-3,3,5-trimethylcyclohexane, and 1,1-bis(4-hydroxy-3-methylphenyl)cyclohexane. As the aromatic dihydroxy compound, a mixture of one type or two or more types of these resins can be used.

From a viewpoint of suppressing warpage deformation, the glass transition temperature of the aromatic polycarbonate resin may be preferably 140° C. or less, and more preferably 130° C. or less. On the other hand, from a viewpoint of heat resistance, the glass transition temperature of the aromatic polycarbonate resin may be preferably 100° C. or more, and more preferably 110° C. or more. The definition of the glass transition temperature and the measurement method have been described above. The glass transition temperature of the aromatic polycarbonate resin may be usually 100° C. or more and 140° C. or less, and preferably 100° C. or more and 130° C. or less, 110° C. or more and 140° C. or less, or 110° C. or more and 130° C. or less.

Examples of the aromatic polycarbonate resin having the glass transition temperature of 100-140° C. include those obtained by copolymerizing with an aliphatic dicarboxylic acid. The aromatic polycarbonate resin copolymerized with the aliphatic dicarboxylic acid is a material containing a polycondensed structural unit of an aromatic dihydroxy compound and a carbonic acid and an ester polycondensed structural unit of an aromatic dihydroxy compound and an aliphatic dicarboxylic acid.

Examples of the aliphatic dicarboxylic acid can include: a linear aliphatic dicarboxylic acid such as an adipic acid, a pimelic acid, a suberic acid, an azelaic acid, a sebacic acid, an undecane dicarboxylic acid, a dodecane dicarboxylic acid, a tridecanedicarboxylic acid, a tetradecanedicarboxylic acid, a pentadecane dicarboxylic acid, a hexadecane dicarboxylic acid, an octadecane dicarboxylic acid, and an eicosanedicarboxylic acid; and an alicyclic dicarboxylic acid such as a 1,3-cyclohexanedicarboxylic acid, a 1,4-cyclohexanedicarboxylic acid, a dicyclohexane methane-4,4'-dicarboxylic acid, and a norbornanedicarboxylic acid. As the aliphatic dicarboxylic acid, a mixture of one type or two or more types of these resins can be used.

From a viewpoint of lowering the glass transition temperature, the content of the structural unit derived from the aliphatic dicarboxylic acid in the aromatic polycarbonate resin may be usually 1 mol % or more, preferably 2 mol % or more, more preferably 4 mol % or more, and still more preferably 6 mol % or more (while the content of the structural unit derived from the aromatic dihydroxy compound is usually 99 mol % or less, preferably 98 mol % or less, more preferably 96 mol % or less, and further preferably 94 mol % or less) based on 100 mol % of the sum of the structural unit derived from the aromatic dihydroxy compound (including both of that in the polycondensed structural unit of the aromatic dihydroxy compound and the carbonic acid and that in the ester polycondensed structural unit of the aromatic dihydroxy compound and the aliphatic dicarboxylic acid; hereinafter, the same also applies) and the structural unit derived from the aliphatic dicarboxylic acid. On the other hand, from a viewpoint of heat resistance, it may be usually 20 mol % or less, preferably 16 mol % or less, more preferably 14 mol % or less, and further preferably 12 mol % or less (while the content of structural unit derived from the aromatic dihydroxy compound is usually 80 mol % or more, preferably 84 mol % or more, more preferably 86 mol % or more, and further preferably 88 mol % or more). The content of the structural unit derived from the aliphatic dicarboxylic acid in the aromatic polycarbonate resin may be usually 1 mol % or more and 20 mol % or less, preferably 1 mol % or more and 16 mol % or less, 1 mol % or more and 14 mol % or less, 1 mol % or more and 12 mol % or less, 2 mol % or more and 20 mol % or less, 2 mol % and 16 mol % or less, 2 mol % or more and 14 mol %, 2 mol % or more and 12 mol % or less, 4 mol % or more and 20 mol % or less, 4 mol % or more and 16 mol % less, 4 mol % or more and 14 mol % or less, 4 mol % or more and 12 mol % less, 6 mol % or more and 20 mol % less, 6 mol % or more and 16 mol % or less, 6 mol % or more and 14 mol % or less, or 6 mol % or more and 12 mol % or less, based on 100 mol % of the sum of the structural unit derived from the aromatic dihydroxy compound and the structural unit derived from the aliphatic dicarboxylic acid.

According to at least one embodiment, the content of the structural unit derived from the aliphatic dicarboxylic acid and the content of the structural unit derived from the aromatic dihydroxy compound in the aromatic polycarbonate resin can be obtained by using $^1$H-NMR and $^{13}$C-NMR.

Figure 4:
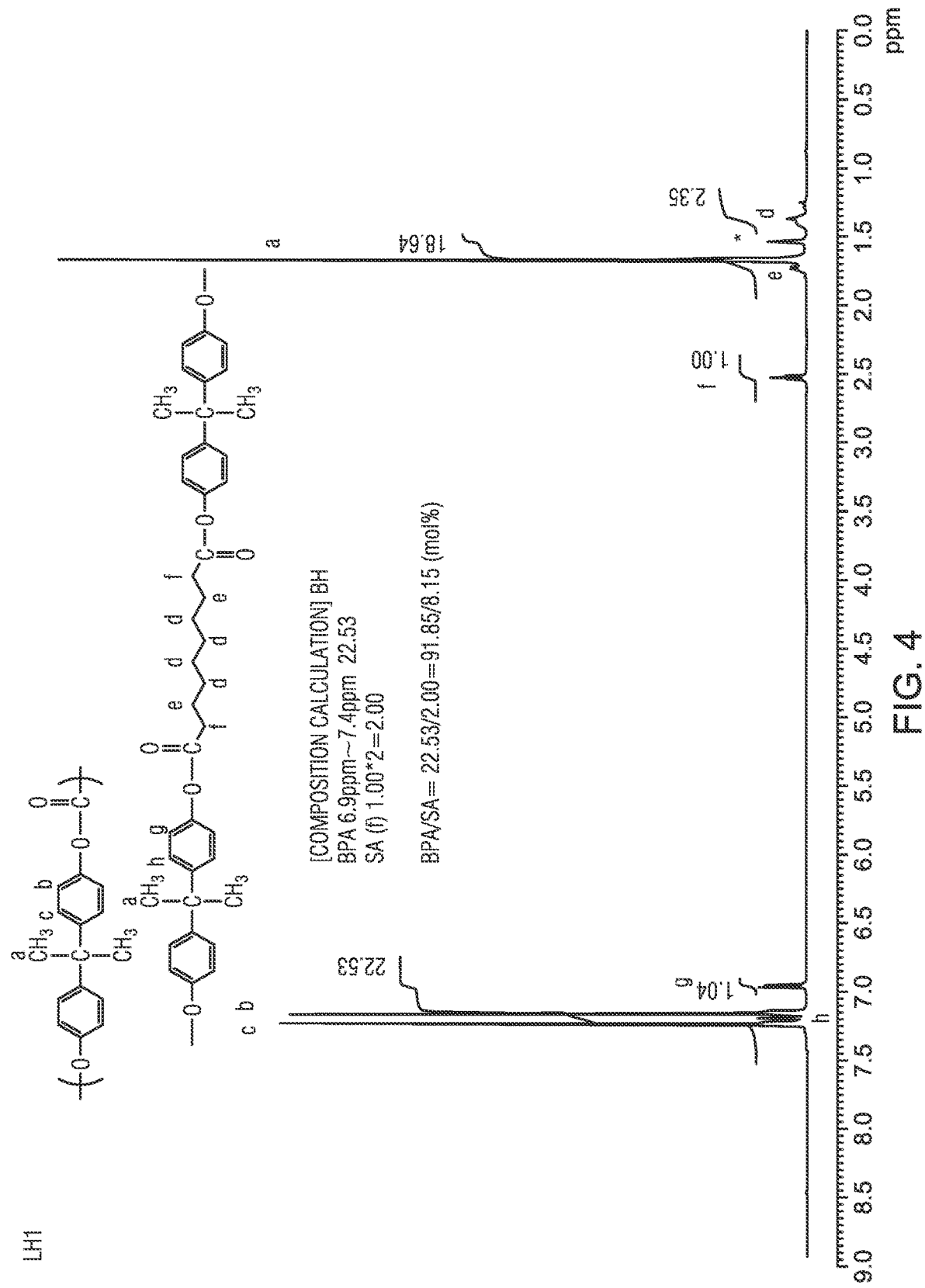
FIG. 4 is a $^1$H-NMR spectrum of an aromatic polycarbonate resin (β-1) used in Examples.

The $^1$H-NMR spectrum can be measured, for example, by dissolving 20 mg of a sample in 0.6 mL of chloroform-$d_1$ solvent and using a 500 MHz nuclear magnetic resonance apparatus under the following conditions. FIG. 4 illustrates an example of measurement of the $^1$H-NMR spectrum of the aromatic polycarbonate resin (β-1) used in Examples described below.

Chemical shift criteria: automatic setting by apparatus
Measurement mode: single pulse
Pulse width: 45° (6.91 μs)
Number of points: 32K
Measurement range: 15 ppm (−2.5 to 12.5 ppm)
Repeat time: 7.0 seconds
Number of integrations: 512 times
Measurement temperature: 25° C.
Window function: exponential (BF: 0.12 Hz)

Figure 5:
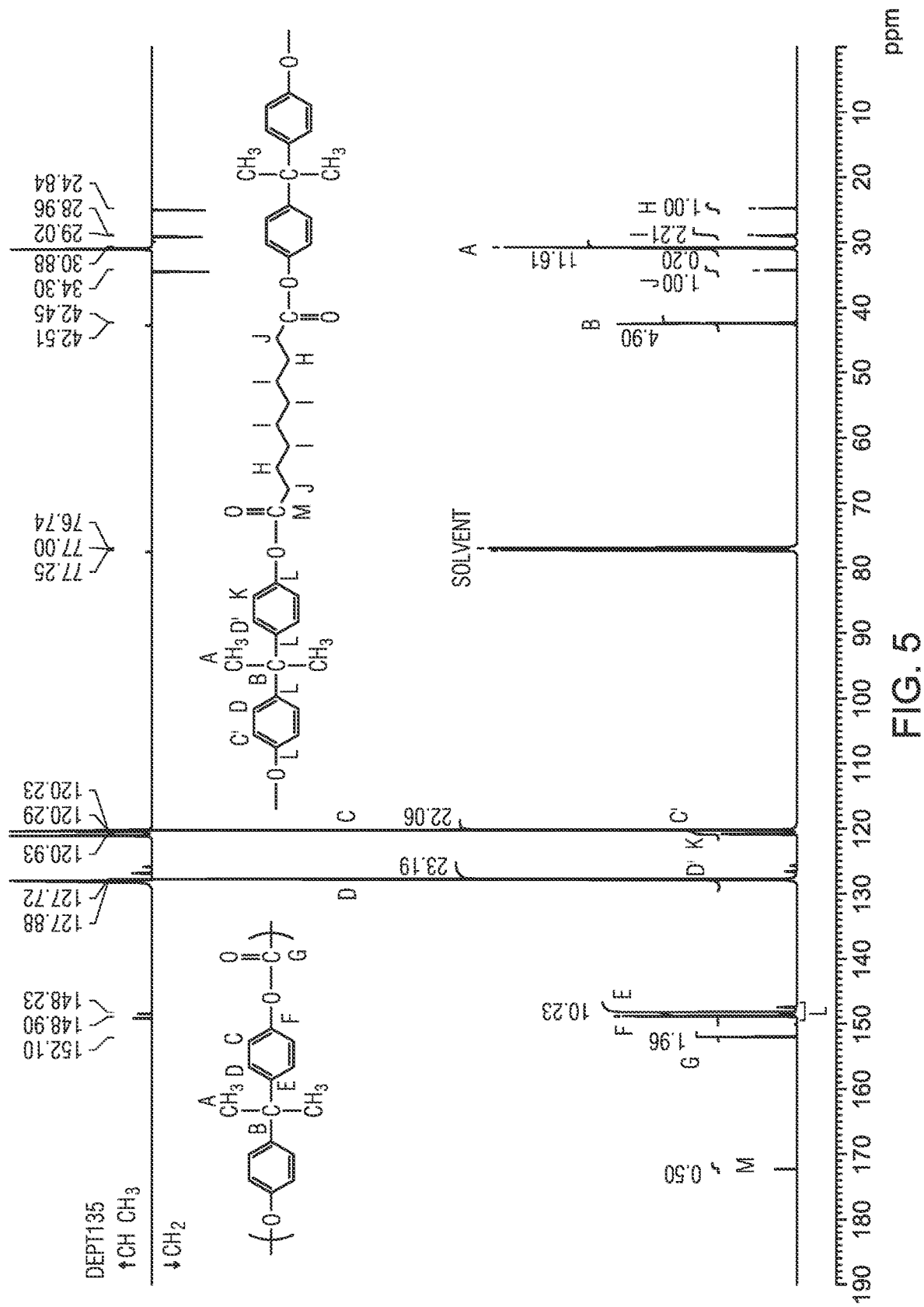
FIG. 5 is a $^{13}$C-NMR spectrum of an aromatic polycarbonate resin (β-1) used in Examples.

The $^{13}$C-NMR spectrum can be measured, for example, by dissolving 60 mg of a sample in 0.6 mL of chloroform-$d_1$ solvent and using a 125 MHz nuclear magnetic resonance apparatus under the following conditions. FIG. 5 illustrates an example of measurement of the $^{13}$C-NMR spectrum of the aromatic polycarbonate resin (β-1) used in Examples described below.

Chemical shift criteria: automatic setting by apparatus
Measurement mode: single pulse proton broadband decoupling
Pulse width: 30° (3.70 μs)
Number of points: 32K
Measurement range: 250 ppm (−25 to 225 ppm)
Repeat time: 3.0 seconds
Number of integrations: 15,000 times
Measurement temperature: 25° C.
Window function: exponential (BF: 1.00 Hz)

Peak attribution can be performed with reference to "Polymer Analysis Handbook (First edition, vol. 1, Sep. 20, 2008, Edited by the Polymer Analytical Council of Japan Analytical Chemistry, Asakura Shoten Co., Ltd.)" or "NMR database of Materials Information Station (National Institute for Materials Science and Technology, http://polymer.nims go.jp/NMR/)", and the ratio of each structural unit in the aromatic polycarbonate resin constituting the (β) layer can be calculated from the peak area ratio. The measurements of $^1$H-NMR and $^{13}$C-NMR can also be performed at an analytical institution such as Mitsui Chemical Analysis Center, Inc.

According to at least one embodiment, the aromatic polycarbonate resin may be a resin mixture containing two or more kinds. In the case of the resin mixture, the sum of the contents of the structural unit derived from the aliphatic dicarboxylic acid as the mixture and the sum of the contents of the structural unit derived from the aromatic dihydroxy compound may be controlled to fall within the above-described range. In addition, the aromatic polycarbonate resin is allowed to contain any structural units other than the structural unit derived from the aliphatic dicarboxylic acid or the structural unit derived from the aromatic dihydroxy compound, for example, the structural unit derived from an aliphatic dihydroxy compound or the structural unit derived from an aromatic dicarboxylic acid.

As the aromatic polycarbonate resin, a mixture of one kind or two or more kinds of these resins can be used.

If desired, the aromatic polycarbonate resin may contain a core-shell rubber as long as it does not contradict the purpose of various embodiments. When the core-shell rubber is used in an amount of usually 0 to 30 parts by mass, and preferably 0 to 10 parts by mass, based on 100 parts by mass of the aromatic polycarbonate-based resin, the cutting processability and impact resistance can be enhanced.

Examples of the core/shell rubber include a methacrylic acid ester/styrene/butadiene rubber graft copolymer, an acrylonitrile styrene/butadiene rubber graft copolymer, an acrylonitrile styrene/ethylene propylene rubber graft copolymer, an acrylonitrile styrene/acrylic acid ester graft copolymer, a methacrylic acid ester/acrylic acid ester rubber graft copolymer, and a methacrylic acid ester/acrylonitrile/acrylic acid ester rubber graft copolymer. As the core-shell rubber, a mixture of one type or two or more types of these resins can be used.

If desired, as long as it does not contradict the purpose of various embodiments, the aromatic polycarbonate resin can further contain: a thermoplastic resin other than the aromatic polycarbonate resin or the core-shell rubber; a pigment, an inorganic filler, an organic filler, or a resin filler; and an additive such as a lubricant, an antioxidant, a weather resistance stabilizer, a heat stabilizer, a release agent, an antistatic agent, and a surfactant. Generally, the blending amount of the optional component(s) is usually about 0.01 to 10 parts by mass based on 100 parts by mass of the aromatic polycarbonate resin.

The method for producing the multilayer film according to the various embodiments includes the step (B) for feeding and pressing the molten film of the multilayer film between the first mirror-finished body that rotates or circulates and the second mirror-finished body that rotates or circulates so that the first acrylic resin layer (α1) is disposed on the first-mirror-finished-body side. Here, "the first acrylic resin layer (α1) is disposed on the first-mirror-finished-body side" means that, on both sides of the aromatic polycarbonate resin layer (β), the surface of the molten film of the multilayer film in the direction of the first acrylic resin layer (α1) comes into contact with the first mirror-finished body, and, at the same time, the surface of the molten film of the multilayer film in the direction of the second acrylic resin layer (α2) comes into contact with the second mirror-finished body. The surface of the molten film of the multilayer film in the direction of the first acrylic resin layer (α1) is usually the surface of the first acrylic resin layer (α1) itself, but may be the surface of another additional layer.

Examples of the first mirror-finished body include a mirror-finished roll or a mirror-finished belt. Examples of the second mirror-finished body include a mirror-finished roll or a mirror-finished belt.

According to at least one embodiment, the mirror-finished roll is a roll whose surface is mirror finished, and is made of a metal, a ceramic, a silicone rubber, or the like. For the purpose of protecting the surface of the mirror-finished roll from corrosion and scratches, chrome plating, iron-phosphorus alloy plating, hard carbon treatment by a PVD method or a CVD method, or the like can be performed.

According to at least one embodiment, the mirror-finished belt is a seamless belt whose surface is mirror finished and is usually made of a metal. The mirror-finished belt is arranged, for example, to loop around a pair of belt rollers and circulate between them. For the purpose of protecting the surface of the mirror-finished belt from corrosion and scratches, chrome plating, iron-phosphorus alloy plating, hard carbon treatment by a PVD method or a CVD method, or the like can be performed.

The mirror finishing is not limited and can be performed by any method. Examples of the mirror finishing include a method for polishing with fine abrasive grains so that the arithmetic mean roughness (Ra) of the mirror-finished body is preferably 100 nm or less, and more preferably 50 nm or less, and/or the ten-point mean roughness (Rz) is preferably 500 nm or less, and more preferably 250 nm or less.

Although not intended to be bound by theory, it is assumed that the molten film of the multilayer film is pressed between the first mirror-finished body and the second mirror-finished body so that the highly smooth surface states of the first mirror-finished body and the second mirror-finished body can be transferred to the film and defective portions such as die stripes are corrected.

According to at least one embodiment, the surface temperatures of the first mirror-finished body and the second mirror-finished body are set so as to satisfy the following formulae (1) to (3):

$$(T\alpha_1-15) \leq TR_1 \leq (T\alpha_1+10) \tag{1}$$

$$(T\alpha_2-25) \leq TR_2 < (T\alpha_2+5) \tag{2}$$

$$(T\beta-20) \leq TR_1 \tag{3}$$

Here, $TR_1$ is the surface temperature of the first mirror-finished body, $TR_2$ is the surface temperature of the second mirror-finished body, $T\alpha_1$ is the glass transition temperature of the first acrylic resin, $T\alpha_2$ is the glass transition temperature of the second acrylic resin, and $T\beta$ is the glass transition temperature of the aromatic polycarbonate resin. All temperature units are ° C. The definition of the glass transition temperature and the measurement method have been described above.

From a viewpoint of preventing the development on the (α1) layer of appearance faults (exfoliation marks) accompanying the peeling-off from the first mirror-finished body, the surface temperature of the first mirror-finished body is usually $(T\alpha_1+10)°$ C. or less, preferably $(T\alpha_1+7)°$ C. or less, and more preferably $(T\alpha_1+5)°$ C. or less. On the other hand, from a viewpoint of sufficiently alleviating the stress caused by the shear in the T die or the extensional deformation in air gap and suppressing the warpage deformation, the surface temperature of the first mirror-finished body is usually $(T\alpha_1-15)°$ C. or more, preferably $(T\alpha_1-10)°$ C. or more, and more preferably $(T\alpha_1-5)°$ C. or more. The surface temperature of the first mirror-finished body may be preferably $(T\alpha_1-15)°$ C. or more and $(T\alpha_1+7)°$ C. or less, $(T\alpha_1-15)°$ C. or more and $(T\alpha_1+5)°$ C. or less, $(T\alpha_1-10)°$ C. or more and $(T\alpha_1+10)°$ C. or less, $(T\alpha_1-10)°$ C. or more and $(T\alpha_1+7)°$ C. or less, $(T\alpha_1-10)°$ C. or more and $(T\alpha_1+5)°$ C. or less, $(T\alpha_1-5)°$ C. or more and $(T\alpha_1+10)°$ C. or less, $(T\alpha_1-5)°$ C. or more and $(T\alpha_1+7)°$ C. or less, or $(T\alpha_1-5)°$ C. or more and $(T\alpha_1+5)°$ C. or less. On the other hand, from a viewpoint of sufficiently alleviating the stress caused by the shear in the T die or the extensional deformation in air gap and suppressing the warpage deformation, the surface temperature of the first mirror-finished body is usually $(T\beta-20)°$ C. or more, preferably $(T\beta-15)°$ C. or more, and more preferably $(T\beta-10)°$ C. or more.

From a viewpoint of preventing the development on the (α2) layer of appearance faults (exfoliation marks) accompanying the peeling-off from the second mirror-finished body and from a viewpoint of enabling the step (C) to be satisfactorily performed, the surface temperature of the second mirror-finished body is usually $(T\alpha_2+5)°$ C. or less, and preferably $(T\alpha_2)°$ C. or less. On the other hand, from a viewpoint of sufficiently alleviating the stress caused by the shear in the T die or the extensional deformation in air gap and suppressing the warpage deformation, the surface temperature of the second mirror-finished body is usually $(T\alpha_2-25)°$ C. or more, preferably $(T\alpha_2-15)°$ C., and more preferably $(T\alpha_2-10)°$ C. or more. The surface temperature of the second mirror-finished body may be preferably $(T\alpha_2-25)°$ C. or more and $(T\alpha_2)°$ C. or less, $(T\alpha_2-15)°$ C. or more and $(T\alpha_2+5)°$ C. or less, $(T\alpha_2-15)°$ C. or more and $(T\alpha_2)°$ C. or less, $(T\alpha_2-10)°$ C. or more and $(T\alpha_2+5)°$ C. or less, or $(T\alpha_2-10)°$ C. or more and $(T\alpha_2)°$ C. or less.

In addition, from a viewpoint of suppressing warpage deformation of the multilayer film and from a viewpoint of preventing the development of appearance faults (exfoliation marks), it is preferable to satisfy the following formula (4-1) and/or the following formula (4-2) in addition to the above formulae (1) to (3) or the preferable ranges thereof. All temperature units are ° C.

$$(T\beta-T\alpha_1) \leq 30 \tag{4-1}$$

$$(T\beta-T\alpha_2) \leq 30 \tag{4-2}$$

From a viewpoint of suppressing warpage deformation and preventing the development of appearance faults (exfoliation marks), the value of $(T\beta-T\alpha_1)$ may be preferably 30° C. or less, more preferably 20° C. or less, and further preferably 15° C. or less.

Similarly, from a viewpoint of suppressing warpage deformation and preventing the development of appearance faults (exfoliation marks), the value of $(T\beta-T\alpha 2)$ may be preferably 30° C. or less, more preferably 20° C. or less, and further preferably 15° C. or less.

It is further preferable that the following formula (5) is satisfied. This is because the multilayer film pressed in the step (B) is held against the first mirror-finished body and sent to the subsequent third mirror-finished body that rotates or circulates.

$$TR_2 < TR_1 \tag{5}$$

In the step (C), the multilayer film pressed in the step (B) is held against the first mirror-finished body and sent to the subsequent third mirror-finished body that rotates or circulates.

Although not particularly limited, in many cases, the multilayer film is no longer in the molten state after the multilayer film is released from the first mirror-finished body in the step (C).

The surface temperature of the third mirror-finished body is not particularly limited, but from a viewpoint of suppressing warpage deformation, the surface temperature of the third mirror-finished body preferably satisfies the following formula (6):

$$(T\beta-20) \leq TR_3 \tag{6}$$

Here, $TR_3$ is the surface temperature of the third mirror-finished body. All temperature units are ° C.

From a viewpoint of suppressing warpage deformation, the surface temperature of the third mirror-finished body may be preferably $(T\beta-20)°$ C. or more, more preferably $(T\beta-15)°$ C. or more, and further preferably $(T\beta-10)°$ C. or more. On the other hand, from a viewpoint of preventing the development on the (α2) layer of appearance faults (exfoliation marks) accompanying the peeling-off from the third mirror-finished body, it may be preferably $(T\alpha_2+5)°$ C. or less, and more preferably $(T\alpha_2)°$ C. or less. The surface temperature of the third mirror-finished body may be preferably $(T\beta-20)°$ C. or more and $(T\alpha_2+5)°$ C. or less, $(T\beta-20)°$ C. or more and $(T\alpha_2)°$ C. or less, $(T\beta-15)°$ C. or more and $(T\alpha_2+5)°$ C. or less, $(T\beta-15)°$ C. or more and $(T\alpha_2)°$ C. or less, $(T\beta-10)°$ C. or more and $(T\alpha_2+5)°$ C. or less, or $(T\beta-10)°$ C. or more and $(T\alpha_2)°$ C. or less.

An example of a preferred production method of the various embodiments will be further described with reference to FIG. 1, but the production method of various embodiments is not intended to be limited thereto. FIG. 1 is a conceptual diagram illustrating an example of an apparatus used in a production method of various embodiments. The acrylic resin used as the first acrylic resin and the second acrylic resin (used for both the (α1) layer and the (α2) layer) is preferably sufficiently dried before being subjected to film formation and is directly transported and introduced from the dryer to the extruder 1 for both outer layers. The aromatic polycarbonate resin is preferably sufficiently dried before being subjected to film formation and then directly transported and introduced from the dryer to the extruder 2 for intermediate layer. As both outer layers (the (α1) layer and the (α2) layer), the acrylic resin introduced by the extruder 1 for both outer layers is continuously coextruded from a two-kind three-layer multi-manifold type coextrusion T-die 3, and as the intermediate layer (the (β) layer), the aromatic polycarbonate resin introduced by the extruder 2 for intermediate layer is continuously coextruded from the two-kind three-layer multi-manifold type coextrusion T-die 3.

According to at least one embodiment, the coextrusion T die 3 is usually set to 240° C. or more, and preferably 250° C. or more, and usually 320° C. or less, and preferably 300° C. or less. The extruder 1 for both outer layers and the extruder 2 for intermediate layer are preferably vacuum-vented in the metering zone at the tip of the screw. In addition, it is preferably purged with nitrogen.

The molten film 4 of the multilayer film in which the first acrylic resin layer (α1), the aromatic polycarbonate resin layer (β), and the second acrylic resin layer (α2) continuously coextruded from the coextrusion T die 3, are directly laminated in the stated order is fed and pressed between a rotating first mirror-finished roll 5 and a rotating second mirror-finished roll 6 so that the (α1) layer is disposed on the first mirror-finished roll 5 side. Therefore, it can be considered that the highly smooth surface states of the first mirror-finished roll 5 and the second mirror-finished roll 6 are transferred to the molten film 4 of the multilayer film, and defective portions such as die stripes are corrected.

According to at least one embodiment, the first mirror-finished roll 5 and the second mirror-finished roll 6 are usually arranged in a highly parallel and horizontal manner. Usually, the molten film 4 of the multilayer film extruded from the coextrusion T die 3 is conveyed substantially in the direction of gravitational force and usually contacts the first mirror-finished roll 5 and the second mirror-finished roll 6 at substantially the same time. That is, the angle between the vertical plane including the gap between the first mirror-finished roll 5 and the second mirror-finished roll 6 and the molten film 4 of the multilayer film is generally less than 2°, preferably 1° or less, more preferably 0.5° or less, further preferably 0.1° or less, and most preferably 0°.

As the first mirror-finished roll 5 and the second mirror-finished roll 6, those described above can be used.

The surface temperature of the first mirror-finished roll 5 is normally set to $(T\alpha+10)°$ C. or less, preferably $(T\alpha+7)°$ C. or less, and more preferably $(T\alpha+5)°$ C. or less. On the other hand, the surface temperature of the first mirror-finished roll 5 is preferably set to $(T\beta-20)°$ C. or more, more preferably $(T\beta-15)°$ C. or more, and further preferably $(T\beta-10)°$ C. or more. In addition, the surface temperature of the first mirror-finished roll 5 is usually set to $(T\alpha-15)°$ C. or more, preferably $(T\alpha-10)°$ C. or more, and more preferably $(T\alpha-5)°$ C. or more.

The surface temperature of the second mirror-finished roll 6 is normally set to $(T\alpha+5)°$ C. or less, and preferably to $(T\alpha)°$ C. or less. On the other hand, the surface temperature of the second mirror-finished roll 6 is usually set to $(T\alpha-25)°$ C. or more, preferably $(T\alpha-15)°$ C. or more, and more preferably $(T\alpha-10)°$ C. or more. In addition, the surface temperature of the second mirror-finished roll 6 is preferably set lower than the surface temperature of the first mirror-finished roll 5.

Here, Tα is the glass transition temperature of the acrylic resin used as the first acrylic resin and the second acrylic resin, and Tβ is the glass transition temperature of the aromatic polycarbonate resin. The definition of the glass transition temperature and the measurement method have been described above.

The molten film 4 of the multilayer film pressed by the first mirror-finished roll 5 and the second mirror-finished roll 6 is held by the first mirror-finished roll 5 and thereafter released from the first mirror-finished roll, and the released multilayer film 7 is sent to the rotating third mirror-finished roll 8.

On the other hand, the surface temperature of the third mirror-finished roll is preferably set to $(T\beta-20)°$ C. or more, more preferably $(T\beta-15)°$ C. or more, and further preferably $(T\beta-10)°$ C. or more. On the other hand, the surface temperature of the third mirror-finished roll is preferably set to $(T\alpha+5)°$ C. or less, and more preferably to $(T\alpha)°$ C. or less.

2. Multilayer Film

The multilayer film of various embodiments is a multilayer film in which the first acrylic resin layer (α1), the aromatic polycarbonate resin layer (β), and the second acrylic resin layer (α2) are directly laminated in the stated order, and the glass transition temperature (Tβ) of the aromatic polycarbonate resin is 100-140° C. and satisfies the following formulae (4-1) and (4-2):

$$(T\beta-T\alpha_1) \leq 30 \quad (4-1)$$

$$(T\beta-T\alpha_2) \leq 30 \quad (4-2)$$

As defined above, $T\alpha_1$ is the glass transition temperature of the first acrylic resin, $T\alpha_2$ is the glass transition temperature of the second acrylic resin, and Tβ is the glass transition temperature of the aromatic polycarbonate resin. All temperature units are ° C. The definition of the glass transition temperature and the measurement method have been described above.

The thickness of each layer of the (α1) layer, the (β) layer and the (α2) layer and the total thickness of the multilayer film have been described above in the explanation of the method for producing the multilayer film according to various embodiments.

The first acrylic resin used for the (α1) layer and the second acrylic resin used for the (α2) layer have been described above in the explanation of the method for producing the multilayer film according to various embodiments. Among them, vinyl cyclohexane-methyl (meth)acrylate copolymer is preferable. In this case, an acrylic resin containing a structural unit derived from methyl(meth)acrylate in an amount of 50-95 mol % and a structural unit derived from vinylcyclohexane in an amount of 50-5 mol % based on 100 mol % of the sum of structural units derived from polymerizable monomers is more preferable. In particular, vinyl cyclohexane-methyl methacrylate copolymer is preferable. In this case, an acrylic resin containing a structural unit derived from methyl methacrylate in an amount of 50-95 mol % and a structural unit derived from vinylcyclohexane in an amount of 50-5 mol % based on 100 mol % of the sum of structural units derived from polymerizable monomers is more preferable.

From a viewpoint of suppressing warpage deformation, it is preferable that the first acrylic resin and the second acrylic resin in the multilayer film of various embodiments are the same acrylic resin (i.e., the same acrylic resin is used for both the ($\alpha$1) layer and the ($\alpha$2) layer). In the multilayer film of various embodiments, it is preferable that the first acrylic resin and the second acrylic resin are the same acrylic resin, and the amounts of the structural unit derived from methyl (meth)acrylate (particularly, preferably methyl methacrylate) and the structural unit derived from vinylcyclohexane satisfy any one of the above-described range groups.

The aromatic polycarbonate resin used for the ($\beta$) layer has been described above in the explanation of the method for producing the multilayer film according to various embodiments.

From a viewpoint of suppressing warpage deformation, the glass transition temperature of the aromatic polycarbonate resin is usually 140° C. or less, and preferably 130° C. or less. On the other hand, from a viewpoint of heat resistance, the glass transition temperature of the aromatic polycarbonate resin is usually 100° C. or more, and preferably 110° C. or more. The glass transition temperature of the aromatic polycarbonate resin is usually 100° C. or more and 140° C. or less, and preferably 100° C. or more and 130° C. or less, 110° C. or more and 140° C. or less, or 110° C. or more and 130° C. or less. The definition of the glass transition temperature and the measurement method have been described above.

The aromatic polycarbonate resin having a glass transition temperature of 100-140° C. has been described above in the explanation of the method for producing the multilayer film according to various embodiments. Among them, an aromatic polycarbonate resin containing 99-80 mol % of a structural unit derived from an aromatic dihydroxy compound and 1-20 mol % of a structural unit derived from an aliphatic dicarboxylic acid based on 100 mol % of the sum of the structural unit derived from the aromatic dihydroxy compound and the structural unit derived from the aliphatic dicarboxylic acid is preferable. This molar ratio is preferably 99-84 mol %/1 mol % or more and 16 mol % or less, 99-86 mol %/1 mol % or more and 14 mol % or less, 99-88 mol %/1 mol % or more and 12 mol % or less, 98-80 mol %/2 mol % or more and 20 mol % or less, 98-84 mol %/2 mol % or more and 16 mol % or less, 98-86 mol %/2 mol % or more and 14 mol % or less, 98-88 mol %/2 mol % or more and 12 mol % or less, 96-80 mol %/4 mol % or more and 20 mol % or less, 96-84 mol %/4 mol % or more and 16 mol % or less, 96-86 mol %/4 mol % or more and 14 mol % or less, 96-88 mol %/4 mol % or more and 12 mol % or less, 94-80 mol %/6 mol % or more and 20 mol % or less, 94-84 mol %/6 mol % or more and 16 mol % or less, 94-86 mol %/6 mol % or more and 14 mol % or less, or 94-88 mol %/6 mol % or more and 12 mol % or less.

From a viewpoint of suppressing warpage deformation and improving appearance, the value of (T$\beta$−T$\alpha_1$) may be normally 30° C. or less, preferably 20° C. or less, and more preferably 15° C. or less.

Similarly, from a viewpoint of suppressing warpage deformation and improving appearance, the value of (T$\beta$−T$\alpha_2$) may be normally 30° C. or less, preferably 20° C. or less, and more preferably 15° C. or less.

The values of (T$\beta$−T$\alpha_1$) and (T$\beta$−T$\alpha_2$) are usually 30° C. or less/30° C. or less (both are 30° C. or less), preferably 30° C. or less/20° C. or less, 30° C. or less/15° C. or less, 20° C. or less/30° C. or less, 20° C. or less/20° C. or less, 20° C. or less/15° C. or less, 15° C. or less/30° C. or less, 15° C. or less/20° C. or less, or 15° C. or less/15° C. or less.

The multilayer film of the various embodiments is not particularly limited, and can be obtained by any production methods. The multilayer film of the various embodiments can be preferably obtained by the above-described method for producing the multilayer film according to various embodiments.

In the multilayer film of various embodiments, the total light transmittance (measured according to JIS K7361-1: 1997 by using a turbidimeter "NDH 2000" (trade name) commercially available from Nippon Denshoku Industries Co., Ltd.) may be preferably 85% or more, more preferably 88% or more, and further preferably 90% or more. When the multilayer film of various embodiments has a total light transmittance of 85% or more, it can be suitably used as an image display device member. A higher total light transmittance of the multilayer film is preferable.

The multilayer film of various embodiments may have a retardation (measured by parallel Nicole rotation method by using a retardation measurement device "KOBRA-WR" (trade name) commercially available from Oji Test Instrument Co., Ltd.) of usually 75 nm or less, preferably 50 nm, more preferably 40 nm or less, further preferably 30 nm or less, even more preferably 20 nm or less, and most preferably 15 nm or less. When the multilayer film of various embodiments has a retardation of 75 nm or less, it can be suitably used as an image display device member. A lower retardation of the multilayer film is preferable.

The multilayer film of various embodiments may preferably have a total light transmittance of 85% or more and a retardation of 75 nm or less, a total light transmittance of 85% or more and a retardation of 50 nm or less, a total light transmittance of 85% or more and a retardation of 40 nm or less, a total light transmittance of 85% or more and a retardation of 30 nm or less, a total light transmittance of 85% or more and a retardation of 20 nm or less, a total light transmittance of 85% or more and a retardation of 15 nm or less, a total light transmittance of 88% or more and a retardation of 75 nm or less, a total light transmittance of 88% or more and a retardation of 50 nm or less, a total light transmittance of 88% or more and a retardation of 40 nm or less, a total light transmittance of 88% or more and a retardation of 30 nm or less, a total light transmittance of 88% or more and a retardation of 20 nm or less, a total light transmittance of 88% or more and a retardation of 15 nm or less, a total light transmittance of 90% or more and a retardation of 75 nm or less, a total light transmittance of 90% or more and a retardation of 50 nm or less, a total light transmittance of 90% or more and a retardation of 40 nm or less, a total light transmittance of 90% or more and a retardation of 30 nm or less, a total light transmittance of 90% or more and a retardation of 20 nm or less, or a total light transmittance 90% or more and retardation 15 nm or less.

The multilayer film of various embodiments may have a water absorption (measured according to test (3) in the examples described later) of usually about 1.4 mass % or less, preferably 1 mass % or less, more preferably 0.7 mass % or less, further preferably 0.6 mass % or less, and most preferably 0.5 mass % or less. When the multilayer film of various embodiments has a water absorption of usually about 1.4 mass % or less, and preferably 1 mass %, it can be suitably used as an image display device member. A lower water absorption of the multilayer film is preferable. In one aspect, it is preferable that the multilayer film of various embodiments satisfies the preferable range of the water absorption, and at the same time, the multilayer film satisfies any of the above-described range group combinations for the total light transmittance and the retardation.

The multilayer film of various embodiments may have a yellowness index (measured according to JIS K7105:1981 by using a chromometer "SolidSpec-3700" (trade name) commercially available from Shimadzu Corporation) of preferably 3 or less, more preferably 2 or less, and further preferably 1 or less. When the multilayer film of various embodiments has a yellowness index of 3 or less, it can be suitably used as an image display device member. A lower yellowness index of the multilayer film is preferable. In one embodiment, it is preferable that the multilayer film of various embodiments satisfies the preferable range of the yellowness index, and at the same time, the multilayer film satisfies any of the above-described range group combinations for the total light transmittance and the retardation. Or, it is preferable that the multilayer film of various embodiments satisfies the preferable range of the yellowness index, and at the same time, the multilayer film satisfies any of the above-described range group combinations for the total light transmittance, the retardation, and the water absorption.

3. Hard Coat Laminated Film

The hard coat laminated film of various embodiments is a hard coat laminated film having a hard coat on at least one side of the multilayer film of various embodiments, and preferably on both sides from a viewpoint of suppressing warpage deformation.

The hard coat of the hard coat laminated film of various embodiments is not particularly limited, and any known ones can be used according to the application and purpose. Examples of the preferable hard coat can include hard coats formed by using the techniques described in JP-B-5870222, JP-B-5963376, Japanese Patent Application No. 2016-006936, and Japanese Patent Application No. 2016-029588.

4. Article

The article of various embodiments is an article including the multilayer film or the hard coat laminated film of various embodiments. The article is not particularly limited, but examples of the article can include: an image display device (including an image display device having a touch panel function and an image display device not having a touch panel function) such as a liquid crystal display, a plasma display, and an electroluminescence display, and a member of the image display device such as a display surface plate, a transparent conductive substrate, and a housing; a television, a personal computer, a tablet type information device, a smart phone, and these housings or display faceplates; a refrigerator, a washing machine, a cupboard, a costume shelf, and panels constituting them; a building window and a door; a vehicle, a vehicle window, a windshields, a roof window, and an instrument panel; an electronic signage and a protective plate thereof; and a show window.

In the production of the article of various embodiments, in order to impart high designability to the obtained article, a decorative sheet may be laminated on the surface opposite to the front surface of the multilayer film or the hard coat laminated film of various embodiments (in which the term "front surface" means the surface that is normally visually recognized when the article is practically; hereinafter, the same also applies). This embodiment is particularly effective when the multilayer film and the hard coat laminated film of various embodiments is used as a panel constituting a front surface of a door body for opening and closing a front portion of a main body of an article such as a refrigerator, a washing machine, a dish rack, a costume shelf, or the like, or when used as a panel constituting a plane of a lid body for opening and closing a flat portion of a main body. The decorative sheet is not limited and any decorative sheets can be used. Examples of the decorative sheet can include any colored resin sheets.

Examples of the resin of the colored resin sheet can include: a polyester resin such as aromatic polyester and aliphatic polyester; an acrylic resin; a polycarbonate resin; a poly(meth)acrylimide resin; a polyolefin resin such as polyethylene, polypropylene, and polymethyl pentene; a cellulose resin such as cellophane, triacetyl cellulose, diacetyl cellulose, and acetyl cellulose butyrate; a styrene-based resin such as polystyrene, an acrylonitrile butadiene styrene copolymer resin (ABS resin), a styrene ethylene propylene styrene copolymer, a styrene ethylene ethylene propylene styrene copolymer, and a styrene ethylene butadiene styrene copolymer; a polyvinyl chloride resin; a polyvinylidene chloride resin; a fluorine-containing resin such as polyvinylidene fluoride; and polyvinyl alcohol, ethylene vinyl alcohol, polyether ether ketone, nylon, polyamide, polyimide, polyurethane, polyether imide, polysulfone, and polyethersulfone. These sheets include unstretched sheets, uniaxially oriented sheets, or biaxially oriented sheets. In addition, the resin includes a laminated sheet obtained by laminating two or more layers of one or more of these materials.

The thickness of the colored resin sheet is not particularly limited, but is usually 20 μm or more, preferably 50 μm or more, and more preferably 80 μm or more. In addition, from a viewpoint of meeting the demand for reducing the thickness of the article, the thickness of the colored resin sheet is usually 1,500 μm or less, preferably 800 μm or less, and more preferably 400 μm or less.

A printed layer may be provided on the front side surface of the colored resin sheet, if desired, so as to enhance the sense of design. The printed layer is provided for imparting high designability, and may be formed by printing any pattern by using any ink and any printing machine.

The printing can be wholly or partially performed on the surface opposite to the front surface of the multilayer film or the hard coat laminated film of various embodiments and/or on the front side surface of the colored resin sheet directly or via an anchor coat. Examples of the pattern can include a metal tone pattern such as a hair line, a wood grain pattern, a stone pattern that simulates a surface of a rock such as marble, a cloth pattern that simulates a texture pattern or a cloth-like pattern, a tile sticker pattern, a brickwork pattern, a parquet pattern, and a patchwork. As the printing ink, a material in which a pigment, a solvent, a stabilizer, a plasticizer, a catalyst, a curing agent, and the like are appropriately mixed with a binder can be used. Examples of the binder can include resins, such as a polyurethane resin, a vinyl chloride-vinyl acetate copolymer resin, a vinyl chloride/vinyl acetate/acrylic copolymer resin, a chlorinated polypropylene resin, an acrylic resin, a polyester resin, a polyamide resin, a butyral resin, a polystyrene type resin, a nitrocellulose-based resin, and a cellulose acetate resin, and resin compositions thereof. Further, in order to apply metallic design, aluminum, tin, titanium, indium, and oxides thereof may be wholly or partly vapor deposited by a known method on the surface opposite to the front surface of the multilayer film or the hard coat laminated film of various embodiments and/or on the front side surface of the colored resin sheet directly or via an anchor coat.

The laminating of the multilayer film or the hard coat laminated film of various embodiments and the decorative sheet is not particularly limited and can be performed by any methods. Examples of the above-described method include a dry laminating method using a known adhesive, and a method of forming a layer made of a known pressure-sensitive adhesive and then superposing and pressing both components.

EXAMPLES

Hereinafter, the various embodiments will be described with reference to Examples, but the various embodiments are not limited thereto.

Measurement Methods (1) Total Light Transmittance

The total light transmittance (%) was measured according to JIS K7361-1:1997 by using a turbidimeter "NDH 2000" (trade name) commercially available from Nippon Denshoku Industries Co.

(2) Retardation

The retardation (nm) was measured according to a parallel Nicole rotation method by using a retardation measurement device "KOBRA-WR" (trade name) commercially available from Oji Scientific Instruments Co., Ltd.

(3) Water Absorption (Mass Percentage of Absorbed Water)

The water absorption (mass %) was measured according to an A method of JIS K7209:2009 by using a square (50 mm in a machine direction×50 mm in a lateral direction) sample taken from the multilayer film under the condition of immersion time of 24 hours.

(4) Warpage Deformation

For three portions of the film, which are the central portion in the lateral direction, the left end portion, and the right end portion, samples with 15 cm in a machine direction and 7 cm in a lateral direction were taken from the total of 15 places in 5 places every 10 m in the machine direction of the film and processed at a temperature of 85° C. and a relative humidity of 85% for 16 hours, and the raised height due to the warpage deformation at the four corners was measured when the sample was placed on a horizontal plane with the convex warped surface facing downward.

In the table of results, the worst (the floating height due to warpage deformation is the largest) among each four places of the 15 samples was described. The quality of warpage deformation can be evaluated according to the following criteria. The floating height due to warpage deformation is preferably 8 mm or less, more preferably 5 mm or less, and further preferably 3 mm or less. A smaller warpage deformation in the results is preferable.

(5) Yellowness Index

The yellowness index (no unit) was measured according to JIS K7105:1981 by using a chromometer "SolidSpec-3700" (trade name) commercially available from Shimadzu Corporation.

(6) Surface Appearance

The film surface (for each of both surfaces) was visually observed while varying the angle of incidence of light of a fluorescent lamp and evaluated according to the following criteria.

◎: There are no undulations or flaws on the surface. Even if seen through with the light in the immediate vicinity, there is no cloudy feeling.

○: When looking at close, it is possible to slightly recognize undulations and flaws on the surface. When seen through with the light in the immediate vicinity, there is slight cloudiness.

Δ: Undulations and flaws can be observed on the surface. There is also a sense of cloudiness.

x: Many undulations and flaws can be observed on the surface. There is also obvious cloudiness.

Raw materials used (α) Acrylic Resin (α-1) An acrylic resin containing a structural unit derived from methyl methacrylate in an amount of 76.8 mol % and a structural unit derived from vinylcyclohexane in an amount of 23.2 mol % based on 100 mol % of the sum of structural units derived from polymerizable monomers. The content of each structural unit was measured by $^1$H-NMR (measurement example is illustrated in FIGS. 2A and 2B). Glass transition temperature: 117° C.

(α-2) Poly(meth)acrylic imide "PLEXIMID TT 50" (trade name) commercially available from Evonik. Glass transition temperature: 150° C.

(α-3) Poly(meth)acrylic imide "PLEXIMID TT 70" (trade name) commercially available from Evonik. Glass transition temperature: 175° C.

(β) Aromatic polycarbonate resin (β-1) An aromatic polycarbonate resin containing a structural unit derived from an aromatic dihydroxy compound in an amount of 91.8 mol % and a structural unit derived from an aliphatic dicarboxylic acid in an amount of 8.2 mol %, based on 100 mol % of the sum of the structural units derived from the aromatic dihydroxy compound (bisphenol A (2,2-bis (4-hydroxyphenyl) propane)) and the structural unit derived from the aliphatic dicarboxylic acid (sebacic acid). The content of each structural unit was measured by $^1$H-NMR (measurement example is illustrated in FIG. 4). Glass transition temperature: 127° C.

(β-2) Aromatic polycarbonate "CALIBRE 301-4" (trade name) commercially available from Sumika Stylon Polycarbonate Co., Ltd. Glass transition temperature: 151° C.

Example 1

(A) The coextrusion apparatus having the configuration illustrated in the conceptual diagram in FIG. 1 was used. While the (α-1) was used as both layers (the (α1) layer and the (α2) layer) by the extruder 1 for both outer layers and the (β-1) was used as the intermediate layer by the extruder 2 for intermediate layer, the molten film 4 of the multilayer film in which the (α1) layer, the (β) layer, and the (α2) layer were directly laminated in the stated order was continuously coextruded from the two-kind three-layer multi-manifold type coextrusion T die 3.

(B) The molten film 4 of the multilayer film was fed and pressed between the rotating first mirror-finished roll 5 and the rotating second mirror-finished roll 6 so that the (α1) layer was disposed on the first mirror-finished roll 5 side.

(C) The pressed multilayer film was held against the first mirror-finished roll 5 and sent to the subsequent rotating third mirror-finished roll 8 to obtain a multilayer film in which a total thickness was 250 μm, a layer thickness of the (α1) layer was 60 μm, a layer thickness of the (β) layer was 130 μm, and a layer thickness of the (α2) layer was 60 μm. At this time, the temperature of the coextrusion T die was 270° C., the surface temperature of the first mirror-finished roll was 120° C., the surface temperature of the second mirror-finished roll was 115° C., and the surface temperature of the third mirror-finished roll was 120° C. The take-over speed was 6.5 m/min.

Tests (1) to (6) for the measurement and evaluation of physical properties of the multilayer film were performed. The results are shown in Table 1.

Examples 2 to 6

The production of the multilayer film and the measurement and evaluation of physical properties of the multilayer film were performed in the same manner as in Example 1, except that the surface temperatures of the first mirror-finished roll, the second mirror-finished roll, and the third mirror-finished roll were changed as shown in Table 1. The results are shown in Table 1.

Example 7

The manufacture of the multilayer film and the measurement and evaluation of physical properties of the multilayer film were performed in the same manner as in Example 1, except that the (α-2) was used instead of the (α-1), the (β-2) was used instead of the (β-1), the surface temperature of the first mirror-finished roll was set to 140° C., the surface temperature of the second mirror-finished roll was set to 135° C., and the surface temperature of the third mirror-finished roll was set to 140° C. The results are shown in Table 1.

Example 8

The production of the multilayer film and the measurement and evaluation of physical properties of the multilayer film were performed in the same manner as in Example 1, except that the (α-2) was used instead of the (α-1), the (β-2) was used instead of the (β-1), the surface temperature of the first mirror-finished roll was set to 130° C., the surface temperature of the second mirror-finished roll was set to 120° C., and the surface temperature of the third mirror-finished roll was set to 130° C. The results are shown in Table 1.

Example 9

The production of the multilayer film and the measurement and evaluation of physical properties of the multilayer film were performed in the same manner as in Example 1, except that the (α-3) was used instead of the (α-1), the (β-2) was used instead of the (β-1), the surface temperature of the first mirror-finished roll was set to 160° C., the surface temperature of the second mirror-finished roll was set to 140° C., and the surface temperature of the third mirror-finished roll was set to 160° C. The results are shown in Table 1.

Example 10

The production of the multilayer film and the measurement and evaluation of physical properties of the multilayer film were performed in the same manner as in Example 1, except that the above (β-2) was used instead of the (β-1). The results are shown in Table 1.

TABLE 1

|  |  | Ex.1 | Ex.2 | Ex.3 | Ex.4 | Ex.5 | Ex.6 | Ex.7 | Ex.8 | Ex.9 | Ex.10 |
|---|---|---|---|---|---|---|---|---|---|---|---|
| Surface | TR1 ° C. | 120 | 120 | 115 | 130 | 127 | 105 | 140 | 130 | 160 | 120 |
| temperature | TR2 ° C. | 115 | 100 | 110 | 115 | 125 | 100 | 135 | 120 | 140 | 115 |
| of each mirror-finished body | TR3 ° C. | 120 | 120 | 115 | 120 | 120 | 105 | 140 | 130 | 160 | 120 |
| Glass | T α 1 ° C. | 117 | 117 | 117 | 117 | 117 | 117 | 150 | 150 | 175 | 117 |
| transition | T α 2 ° C. | 117 | 117 | 117 | 117 | 117 | 117 | 150 | 150 | 175 | 117 |
| temperature of each resin | T β ° C. | 127 | 127 | 127 | 127 | 127 | 127 | 151 | 151 | 151 | 151 |
| Measurement | Total light transmittance % | 93 | 93 | 93 | 93 | 93 | 93 | 92 | 92 | 92 | 93 |
| and evaluation | Retardation nm | 8 | 7 | 8 | 9 | 8 | 10 | 18 | 16 | 18 | 9 |
| results of | Water absorption % | 0.34 | 0.33 | 0.36 | 0.38 | 0.40 | 0.35 | 1.41 | 1.53 | 1.47 | 0.35 |
| physical | Warpage deformation mm | 2 | 2 | 4 | 3 | 2 | 18 | 2 | 10 | 10 | 20 |
| properties | Yellowness index | 0.3 | 0.3 | 0.3 | 0.3 | 0.3 | 0.3 | 0.3 | 0.3 | 0.3 | 0.3 |
|  | Surface appearance | ◎ | ○ | ◎ | X | X | ○ | ◎ | ○ | ◎ | ◎ |

These results reveal that the method according to various embodiments enabled the production of a multilayer film having suppressed warpage deformation after moisture and heat treatment and excellent transparency, excellent color tone, excellent appearance, and small retardation.

According to the method of various embodiments, it is possible to obtain a multilayer film in which warpage deformation, particularly warpage deformation after moisture and heat treatment, is suppressed, as compared with the conventional method. In a preferred case, it is possible to obtain a multilayer film which is excellent in transparency, color tone, and appearance, and is small in retardation. When the multilayer film obtained by the method of various embodiments is used as a film substrate, it is possible to obtain a hard coat laminate film that is excellent in transparency, color tone, appearance, surface hardness, abrasion resistance, cutting processability, and crack resistance, and is suitable as a member of an image display device such as a liquid crystal display, a plasma display, and an electroluminescence display (including an image display device having a touch panel function and an image display device having no touch panel function), particularly as a display faceplate of an image display device having a touch panel function.

REFERENCE SIGNS LIST

1 Extruder for both outer layers
2 Extruder for intermediate layer
3 Two-kind three-layer multi-manifold type coextrusion T die
4 Molten film of multilayer film extruded from T die
5 First mirror-finished roll
6 Second mirror-finished roll
7 Multilayer film sent from first mirror-finished roll to third mirror-finished body
8 Third mirror-finished roll

The invention claimed is:

1. A method for producing a multilayer film, comprising:
(A) a step for continuously coextruding, from a T die, a molten film of a multilayer film in which a first acrylic resin layer ($\alpha 1$), an aromatic polycarbonate resin layer ($\beta$), and a second acrylic resin layer ($\alpha 2$) are directly laminated in the stated order by using a coextrusion apparatus provided with an extruder and the T die;
(B) a step for feeding and pressing the molten film of the multilayer film between a first mirror-finished body that rotates or circulates and a second mirror-finished body that rotates or circulates so that the first acrylic resin layer ($\alpha 1$) is disposed on the first-mirror-finished-body side; and
(C) a step for holding the multilayer film pressed in the step (B) against the first mirror-finished body and sending the pressed multilayer film to a subsequent third mirror-finished body that rotates or circulates,
wherein the following formulae (1) to (3) are satisfied:

$$(T\alpha_1 - 15) \leq TR_1 \leq (T\alpha_1 + 10) \quad (1)$$

$$(T\alpha_2 - 25) \leq TR_2 < (T\alpha_2 + 5) \quad (2)$$

$$(T\beta - 20) \leq TR_1 \quad (3)$$

wherein $TR_1$ is a surface temperature of the first mirror-finished body, $TR_2$ is a surface temperature of the second mirror-finished body, $T\alpha_1$ is a glass transition temperature of an acrylic resin constituting the first acrylic resin layer ($\alpha 1$), $T\alpha_2$ is a glass transition temperature of an acrylic resin constituting the second acrylic resin layer ($\alpha 2$), $T\beta$ is a glass transition temperature of an aromatic polycarbonate resin constituting the aromatic polycarbonate resin layer ($\beta$), and all temperature units are ° C.

2. The method according to claim 1, wherein the following formulae (4-1) and (4-2) are satisfied:

$$(T\beta - T\alpha_1) \leq 30 \quad (4-1)$$

$$(T\beta - T\alpha_2) \leq 30 \quad (4-2)$$

where $T\alpha_1$, $T\alpha_2$, and $T\beta$ are as defined above.

3. The method according to claim 1, wherein the glass transition temperature of the aromatic polycarbonate resin constituting the aromatic polycarbonate resin layer ($\beta$) is 100-140° C.

4. The method according to claim 1, wherein the aromatic polycarbonate resin constituting the aromatic polycarbonate resin layer ($\beta$) contains a structural unit derived from an aromatic dihydroxy compound in an amount of 99-80 mol % and a structural unit derived from an aliphatic dicarboxylic acid in an amount of 1-20 mol %, based on 100 mol % of the sum of the structural unit derived from the aromatic dihydroxy compound and the structural unit derived from the aliphatic dicarboxylic acid.

5. The method according to claim 1, wherein the acrylic resin constituting the first acrylic resin layer ($\alpha 1$) and the acrylic resin constituting the second acrylic resin layer ($\alpha 2$) are the same acrylic resin and contain a structural unit derived from methyl (meth)acrylate in an amount of 50-95 mol % and a structural unit derived from vinylcyclohexane in an amount of 50-5 mol %, based on 100 mol % of the sum of structural units derived from polymerizable monomers.

6. A method for producing a hard coat laminated film, comprising:
a step for producing a multilayer film by the method according to claim 1; and
a step for forming a hard coat on at least one side of the multilayer film obtained in the above step.

7. A method for producing an article, comprising:
a step for producing a film by the method according to claim 1; and
a step for forming an article including the film obtained in the above step.

8. The method according to claim 1, wherein the following formula (5) is further satisfied:

$$TR_2 < TR_1 \quad (5),$$

where $TR_1$ and $TR_2$ are as defined above.

9. The method according to claim 1, wherein the following formula (6) is further satisfied:

$$(T\beta - 20) \leq TR_3 \quad (6)$$

where $TR_3$ is the surface temperature of the third mirror-finished body, and $T\beta$ is as defined above.

10. The method according to claim 1, wherein the following formula (7) is further satisfied:

$$TR_3 \leq (T\alpha_2 + 5) \quad (7)$$

where $TR_3$ is the surface temperature of the third mirror-finished body, and $T\alpha_2$ is as defined above.

* * * * *